(12) United States Patent
Ghanbarinejad et al.

(10) Patent No.: US 12,463,703 B2
(45) Date of Patent: Nov. 4, 2025

(54) TRANSMISSIONS TO NOT CAUSE INTERFERENCE

(71) Applicant: Lenovo (Singapore) Pte. Ltd., New Tech Park (SG)

(72) Inventors: Majid Ghanbarinejad, Chicago, IL (US); Hyejung Jung, Northbrook, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 383 days.

(21) Appl. No.: 18/249,622

(22) PCT Filed: Oct. 20, 2021

(86) PCT No.: PCT/IB2021/059687
§ 371 (c)(1),
(2) Date: Apr. 19, 2023

(87) PCT Pub. No.: WO2022/084890
PCT Pub. Date: Apr. 28, 2022

(65) Prior Publication Data
US 2024/0023151 A1 Jan. 18, 2024

Related U.S. Application Data

(60) Provisional application No. 63/094,235, filed on Oct. 20, 2020.

(51) Int. Cl.
*H04W 72/541* (2023.01)
(52) U.S. Cl.
CPC .................................. *H04W 72/541* (2023.01)

(58) Field of Classification Search
CPC ... H04W 72/541; H04W 24/02; H04B 7/0695
See application file for complete search history.

(56) References Cited

U.S. PATENT DOCUMENTS

2020/0008218 A1* 1/2020 Shih ................... H04W 28/0278
2020/0119821 A1* 4/2020 Qin ........................ H04W 24/08
(Continued)

FOREIGN PATENT DOCUMENTS

| EP | 3633884 A1 | 4/2020 |
| WO | 2020063736 A1 | 4/2020 |

OTHER PUBLICATIONS

3GPP TSG RAN WG1 Meeting #94bis R1-1810134 Dated Oct. 8-12, 2018 (Year: 2018).*
(Continued)

*Primary Examiner* — Nizar N Sivji
(74) *Attorney, Agent, or Firm* — Kunzler Bean & Adamson

(57) ABSTRACT

Apparatuses, methods, and systems are disclosed for transmissions to not cause interference. One method includes receiving a first configuration including information of a first reference signal ("RS"). The method includes transmitting the first RS while applying a first spatial filter. The method includes determining whether the first spatial filter is to be used for transmitting a signal to a second wireless node. The method includes receiving a first control message from a third wireless node. The method includes determining, based on the first control message, whether the first spatial filter causes an interference on the third wireless node. The method includes, based on determining that the first spatial filter does not cause the interference on the third wireless node, transmitting the signal to the second wireless node.

17 Claims, 35 Drawing Sheets

(56) References Cited

U.S. PATENT DOCUMENTS

| | | | |
|---|---|---|---|
| 2021/0219155 A1* | 7/2021 | Ye | H04L 5/0091 |
| 2021/0226751 A1* | 7/2021 | Zhang | H04L 5/0048 |
| 2022/0038164 A1* | 2/2022 | Wei | H04L 5/0051 |
| 2022/0046439 A1* | 2/2022 | Hampel | H04B 7/2606 |
| 2023/0007645 A1* | 1/2023 | Liu | H04B 7/0695 |

OTHER PUBLICATIONS

3GPP TSG RAN WGI Meeting #103-e R1-2009108 Dated Oct. 26-Nov. 13, 2020 (Year: 2020).*

CN_111436145_A (Year: 2019).*

WO_2020063736_A1 (Year: 2019).*

PCT/IB2021/059687, "Notification of Transmittal of the International Search Report and the Written Opinion of the International Searching Authority, or the Declaration", International Searching Authority, Feb. 2, 2022, pp. 1-15.

Huawei et al., "On cross-link interference in IAB", 3GPP TSG RAN WG1 Meeting #94bis R1-1810134, Oct. 8-12, 2018, pp. 1-10.

Qualcomm, "New WID on Enhancements to Integrated Access and Backhaul", 3GPP TSG RAN Meeting #86 RP-193251, Dec. 9-12, 2019, pp. 1-5.

3GPP, "3rd Generation Partnership Project; Technical Specification Group Radio Access Network; NR; Study on Integrated Access and Backhaul; (Release 16)", 3GPP TR 38.874 V16.0.0, Dec. 2018, pp. 1-111.

3GPP, "3rd Generation Partnership Project; Technical Specification Group Radio Access Network; NR; Physical channels and modulation (Release 16)", 3GPP TS 38.211 V16.2.0, Jun. 2020, pp. 1-131.

3GPP, "3rd Generation Partnership Project; Technical Specification Group Radio Access Network; NR; Multiplexing and channel coding (Release 16)", 3GPP TS 38.212 V16.2.0, Jun. 2020, pp. 1-151.

3GPP, "3rd Generation Partnership Project; Technical Specification Group Radio Access Network; NR; Physical layer procedures for control (Release 16)", 3GPP TS 38.213 V16.2.0, Jun. 2020, pp. 1-176.

3GPP, "3rd Generation Partnership Project; Technical Specification Group Radio Access Network; NR; Physical layer procedures for data (Release 16)", 3GPP TS 38.214 V16.2.0, Jun. 2020, pp. 1-163.

3GPP, "3rd Generation Partnership Project; Technical Specification Group Radio Access Network; NR; Physical layer measurements (Release 16)", 3GPP TS 38.215 V16.2.0, Jun. 2020, pp. 1-25.

3GPP, "3rd Generation Partnership Project; Technical Specification Group Radio Access Network; NR; Medium Access Control (MAC) protocol specification (Release 16)", 3GPP TS 38.321 V16.1.0, Jul. 2020, pp. 1-151.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.

* cited by examiner

TRANSMISSIONS TO NOT CAUSE INTERFERENCE

CROSS-REFERENCE TO RELATED APPLICATIONS

This application claims priority to U.S. Patent Application Ser. No. 63/094,235 entitled "APPARATUSES, METHODS, AND SYSTEMS FOR INTERFERENCE MANAGEMENT IN INTEGRATED ACCESS AND BACKHAUL" and filed on Oct. 20, 2020 for Majid Ghanbarinej al, which is incorporated herein by reference in its entirety.

FIELD

The subject matter disclosed herein relates generally to wireless communications and more particularly relates to transmissions to not cause interference.

BACKGROUND

In certain wireless communications networks, interference may occur. Interference may result in missed and/or partial communications being made.

BRIEF SUMMARY

Methods for transmissions to not cause interference are disclosed. Apparatuses and systems also perform the functions of the methods. One embodiment of a method includes receiving, at a first wireless node, a first configuration including information of a first reference signal. In some embodiments, the method includes transmitting the first reference signal while applying a first spatial filter. In certain embodiments, the method includes determining whether the first spatial filter is to be used for transmitting a signal to a second wireless node. In various embodiments, the method includes receiving a first control message from a third wireless node. In some embodiments, the method includes determining, based on the first control message, whether the first spatial filter causes an interference on the third wireless node. In certain embodiments, the method includes, based on determining that the first spatial filter does not cause the interference on the third wireless node, transmitting the signal to the second wireless node.

One apparatus for transmissions to not cause interference includes a first wireless node. In some embodiments, the apparatus includes a receiver that receives a first configuration including information of a first reference signal. In various embodiments, the apparatus includes a transmitter that transmits the first reference signal while applying a first spatial filter. In certain embodiments, the apparatus includes a processor that determines whether the first spatial filter is to be used for transmitting a signal to a second wireless node. The receiver receives a first control message from a third wireless node. The processor determines, based on the first control message, whether the first spatial filter causes an interference on the third wireless node. Based on determining that the first spatial filter does not cause the interference on the third wireless node, the transmitter transmits the signal to the second wireless node.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
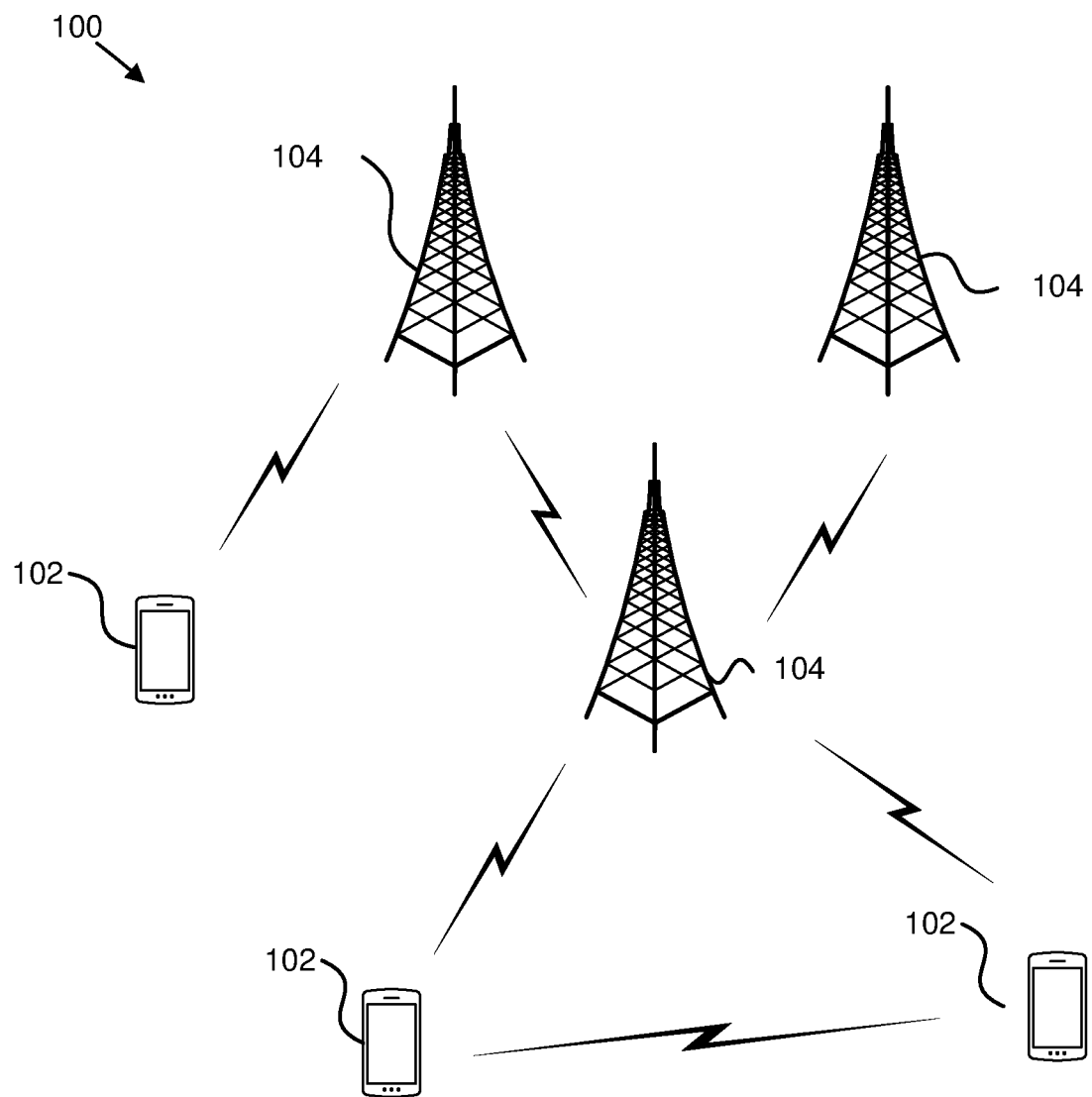
FIG. 1 is a schematic block diagram illustrating one embodiment of a wireless communication system for transmissions to not cause interference.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmissions to not cause interference. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, or a next generation of wireless cellular systems such as 6G, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a network unit 104 may receive, at a first wireless node, a first configuration including information of a first reference signal. In some embodiments, the network unit 104 may transmit the first reference signal while applying a first spatial filter. In certain embodiments, the network unit 104 may determine whether the first spatial filter is to be used for transmitting a signal to a second wireless node. In various embodiments, the network unit 104 may receive a first control message from a third wireless node. In some embodiments, the network unit 104 may determine, based on the first control message, whether the first spatial filter causes an interference on the third wireless node. In certain embodiments, the network unit 104 may, based on determining that the first spatial filter does not cause the interference on the third wireless node, transmit the signal to the second wireless node. Accordingly, the network unit 104 may be used for transmissions to not cause interference.

Figure 2:
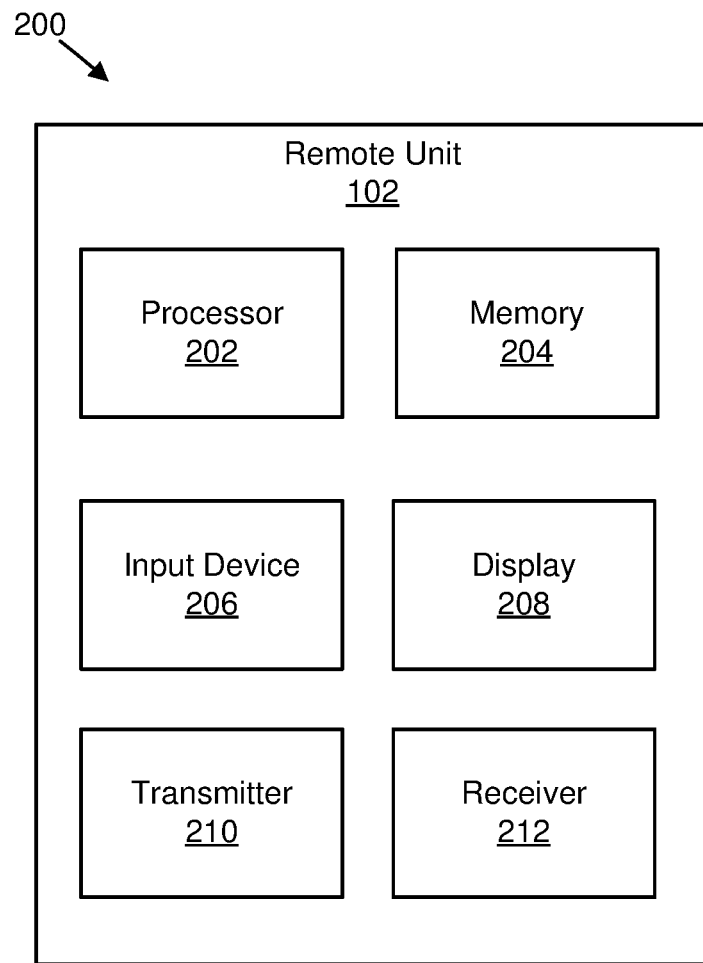
FIG. 2 is a schematic block diagram illustrating one embodiment of an apparatus that may be used for transmissions to not cause interference.

FIG. 2 depicts one embodiment of an apparatus 200 that may be used for transmissions to not cause interference. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
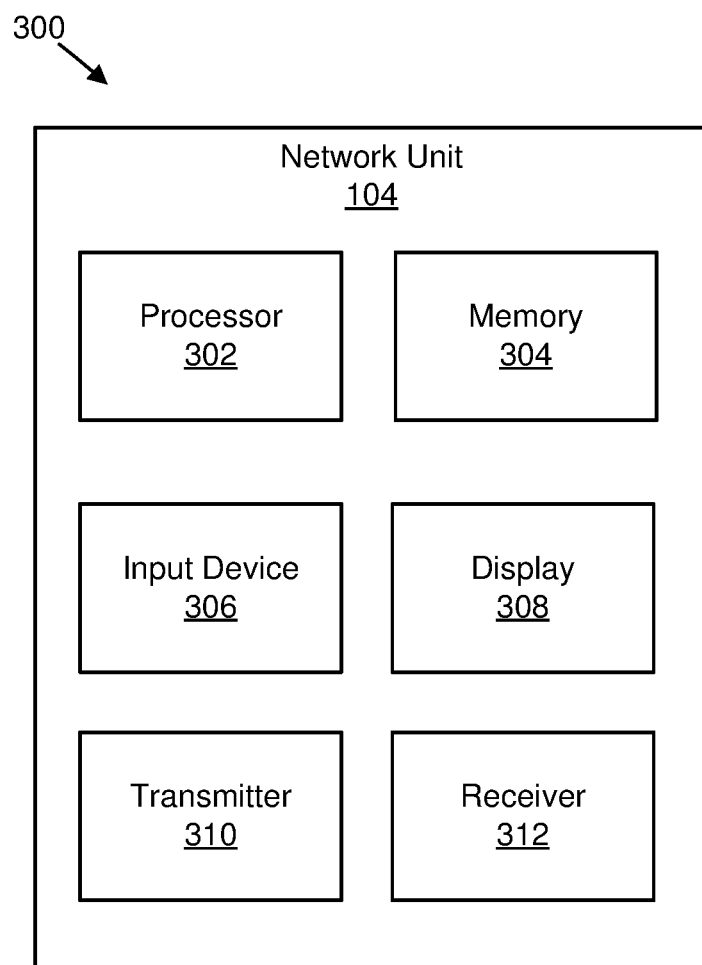
FIG. 3 is a schematic block diagram illustrating one embodiment of an apparatus that may be used for transmissions to not cause interference.

FIG. 3 depicts one embodiment of an apparatus 300 that may be used for transmissions to not cause interference. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 receives a first configuration including information of a first reference signal. In various embodiments, the transmitter 310 transmits the first reference signal while applying a first spatial filter. In certain embodiments, the processor 302 determines whether the first spatial filter is to be used for transmitting a signal to a second wireless node. The receiver 312 receives a first control message from a third wireless node. The processor 302 determines, based on the first control message, whether the first spatial filter causes an interference on the third wireless node. Based on determining that the first spatial filter does not cause the interference on the third wireless node, the transmitter 310 transmits the signal to the second wireless node.

In certain embodiments, an integrated access and backhaul ("IAB") may be used for new radio ("NR") access technology release 16 ("Rel-16"), release 17, release 18, or beyond. The IAB technology may increase deployment flexibility and reducing fifth generation ("5G") rollout costs. Moreover, the IAB technology may enable service providers to reduce cell planning and spectrum planning efforts while using the wireless backhaul technology.

In some embodiments, although IAB is not limited to a specific multiplexing and duplexing scheme, it may be focused on time-division multiplexing ("TDM") between upstream communications (e.g., with a parent IAB node or IAB donor) and downstream communications (e.g., with a child IAB node or a UE).

In various embodiments, there may be enhanced resource multiplexing in release 17 ("Rel-17") to support simultaneous operations (e.g., transmissions and/or receptions) in downstream and upstream by an IAB node, as listed in Table 1.

TABLE 1

Duplexing enhancements:
- Enhancements to the resource multiplexing between child and parent links of an IAB node, including:
  ○ Support of simultaneous operation (transmission and/or reception) of IAB-node's child and parent links (i.e., mobile terminal ("MT") transmit ("TX") and distributed unit ("DU") TX, MT TX and DU RX, MT RX and DU TX, and MT RX and DU RX).
  ○ Support for dual-connectivity scenarios in the context of topology redundancy for improved robustness and load balancing.
- Specification of IAB-node timing modes, extensions for downlink ("DL") and/or uplink ("UL") power control, and cross-link interference ("CLI") and interference measurements of backhaul ("BH") links to support simultaneous operation (transmission and/or reception) by IAB-node's child and parent links.

In various embodiments, interference management is enhanced to facilitate multiplexing between communications with parent and child IAB nodes. The interference includes self-interference ("SI") (e.g., interference from one antenna panel to another antenna panel), and cross-link interference ("CLI") (e.g., interference from one parent-child pair to another parent-child pair), and inter-cell interference ("ICI"). CLI and remote interference management ("RIM") may be used as a starting point for interference management in enhanced IAB systems.

In certain embodiments, there may be enhancements for interference management in enhanced JAB systems.

Figure 4:
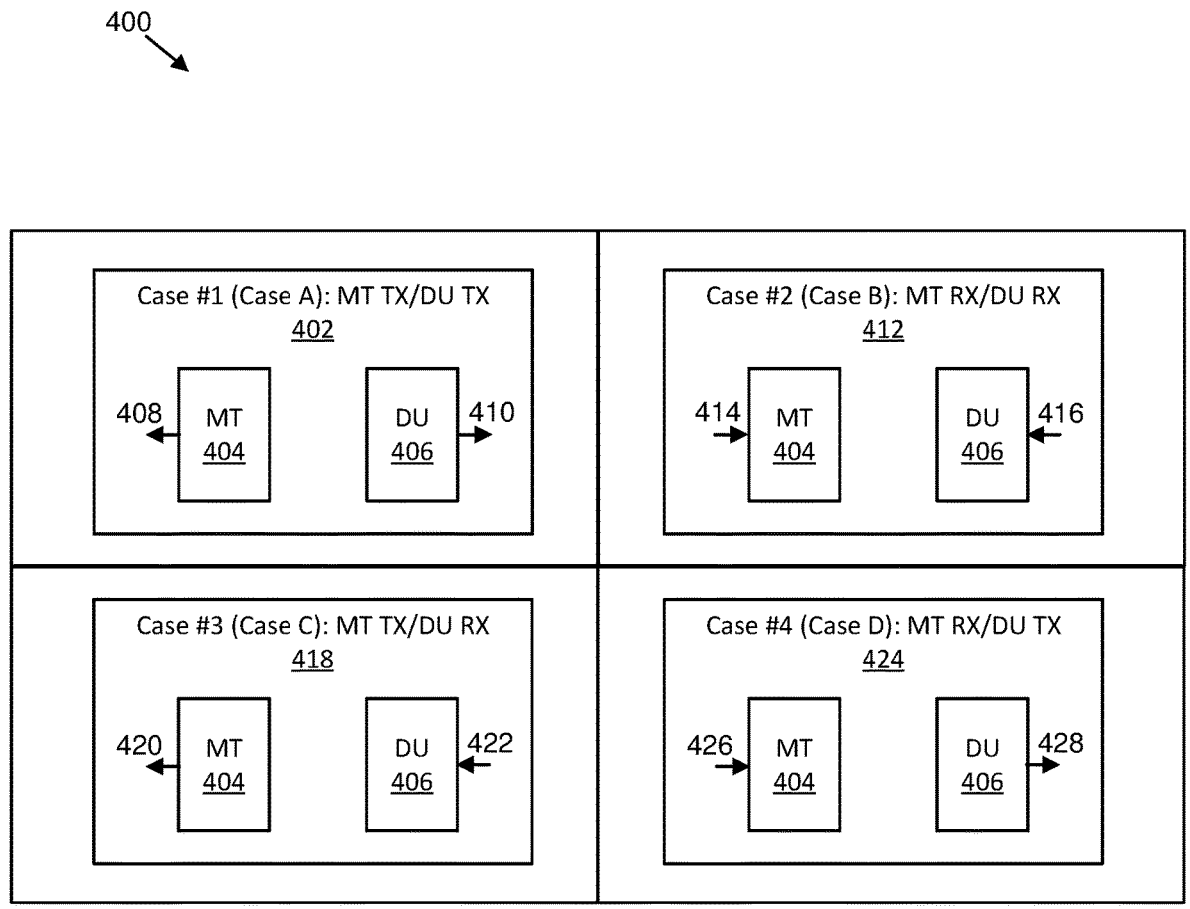
FIG. 4 is a schematic block diagram illustrating one embodiment of types of simultaneous transmission and/or reception operations.

FIG. 4 is a schematic block diagram 400 illustrating one embodiment of types of simultaneous transmission and/or reception operations. The diagram 400 illustrates a first case 402 (e.g., Case #1, Case A, MT TX and DU TX) having an MT 404 and a DU 406, in which the MT 404 transmits 408 and the DU 406 transmits 410. Moreover, the diagram 400 illustrates a second case 412 (e.g., Case #2, Case B, MT RX and DU RX) having the MT 404 and the DU 406, in which the MT 404 receives 414 and the DU 406 receives 416. Further, the diagram 400 illustrates a third case 418 (e.g., Case #3, Case C, MT TX and DU RX) having the MT 404 and the DU 406, in which the MT 404 transmits 420 and the DU 406 receives 422. The diagram 400 illustrates a fourth case 424 (e.g., Case #4, Case D, MT RX and DU TX) having the MT 404 and the DU 406, in which the MT 404 receives 426 and the DU 406 transmits 428. As used herein, different cases may be referred to by the case #, case letter, or description as found in FIG. 4.

Figure 5:
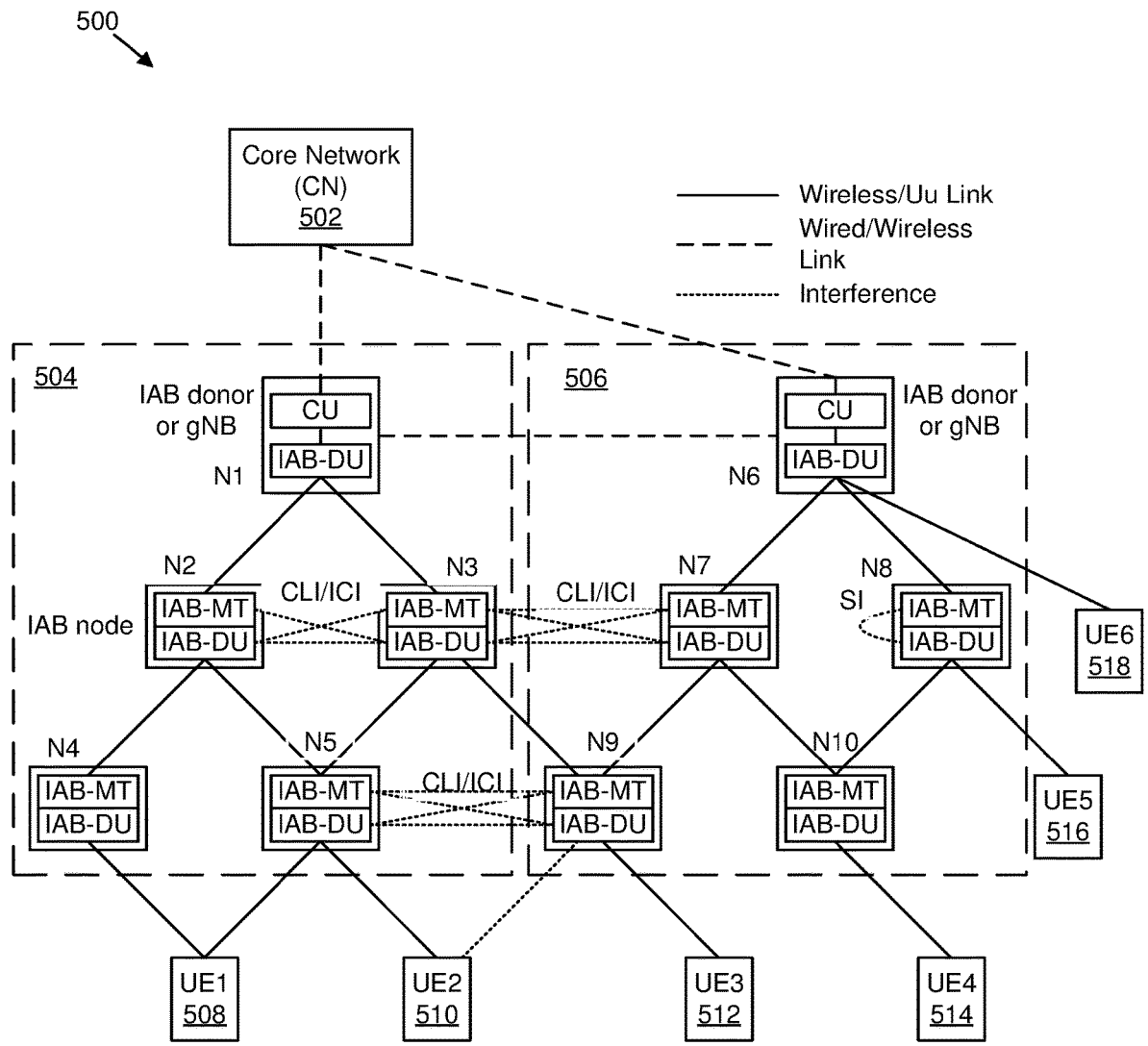
FIG. 5 is a schematic block diagram illustrating one embodiment of a system having CLI/ICI and/or SI.

FIG. 5 is a schematic block diagram illustrating one embodiment of a system 500 having CLI, inter-cell interference ("ICI"), and/or SI. The system 500 includes a core network 502 ("CN"), a first JAB system 504, a second JAB system 506, a first UE 508 (UE1), a second UE 510 (UE2), a third UE 512 (UE3), a fourth UE 514 (UE4), a fifth UE 516 (UE5), and a sixth UE 518 (UE6). Each of the first JAB system 504 and the second JAB system 506 includes a central unit ("CU"), multiple JAB DUs ("JAB-DU"), and multiple JAB MTs ("IAB-MT") that are part of a number of IAB nodes labeled N1 through N10. As shown in FIG. 5, CLI and/or ICI may occur between different JAB nodes. Moreover, SI may occur with a same JAB node.

In FIG. 5, the two JAB systems 504 and 506 are connected to the CN 502, each via an IAB donor (or gNB). Examples of CLI and SI are illustrated in FIG. 5 as follows: 1) communications by an JAB node and/or donor may cause a CLI on a nearby JAB node and/or donor—for example, a transmission by an IAB-DU and/or IAB-MT of N2 may cause a CLI on an IAB-DU or an IAB-MT of N3, or vice versa; 2) CLI may occur between JAB nodes and/or donors in multiple JAB systems—for example, a transmission by an IAB-DU or an IAB-MT of N3 may cause a CLI on an IAB-DU or an IAB-MT of N7, or vice versa; 3) CLI may also occur between an JAB node and/or donor in an JAB system and a UE served by the same or a different JAB system—for example, a transmission by UE2 may cause an interference on N9, or vice versa; and 4) SI may occur among antennas and/or panels of an JAB node and/or donor—for example, a transmission by an IAB-DU of N8 may cause an interference on an IAB-MT of N8, or vice versa—SI may also occur among antennas and/or panels performing operations for a same IAB-DU or different IAB-DUs or a same IAB-MT or different IAB-MTs.

In certain embodiments, depending on the scenario of simultaneous operations, any CLI and/or SI cases may affect a signal quality. In some embodiments, self-interference may occur for Case C and/or Case D.

It should be noted that, in addition to CLI and SI, ICI may occur and impose limitations on performance. The ICI may occur between IAB cells or between an IAB cell and a conventional cell. In either case, the ICI may be handled by a conventional ICI mitigation method and/or by any other embodiment described herein. As used herein, all interference that is not SI may be referred to as CLI, but this may be interchanged and applicable to ICI.

In various embodiments, interference in an IAB system may be measured and/or handled and may relate to one or more of the following: 1) CLI and/or SI; 2) measurements on different types of reference signals: channel state information ("CSI") reference signal ("RS") ("CSI-RS"), sounding reference signal ("SRS"), synchronization signal ("SS") and/or physical broadcast channel ("PBCH") ("SS/PBCH") blocks ("SSBs"), and so forth; 3) CLI within an IAB system (e.g., connected to the network via a same IAB donor) and CLI across IAB systems (e.g., connected to the network via different IAB donors); 3) interference caused by varying beams, transmission powers, timing alignment cases, and so forth; and 4) scenarios with signal and/or channel priorities associated with a type of signals and/or channels, quality-of-service ("QoS"), hybrid automatic repeat request ("HARQ"), and so forth.

In certain embodiments, there may be methods for an early evaluation of CLI and/or SI. Some embodiments may include the following steps for IAB nodes and/or UEs: 1) receive configurations of reference signals; 2) transmit and/or receive availability indication ("AI") for soft resources, or transmit and/or receive DCI messages scheduling channels for downlink and/or uplink communications; 3) transmit reference signals in accordance with the configurations and the scheduled channels or the resources indicated available; 4) receive the reference signals and perform measurements to evaluate interference; and/or 5) take actions in accordance with the evaluated interference. The actions may include: a) transmit or receive measurement reports; b) transmit or receive AI for "other" soft resources; c) transmit or receive control messages scheduling "new" channels; and/or d) perform or cancel and/or reject communication on previously scheduled channels.

Figure 6:
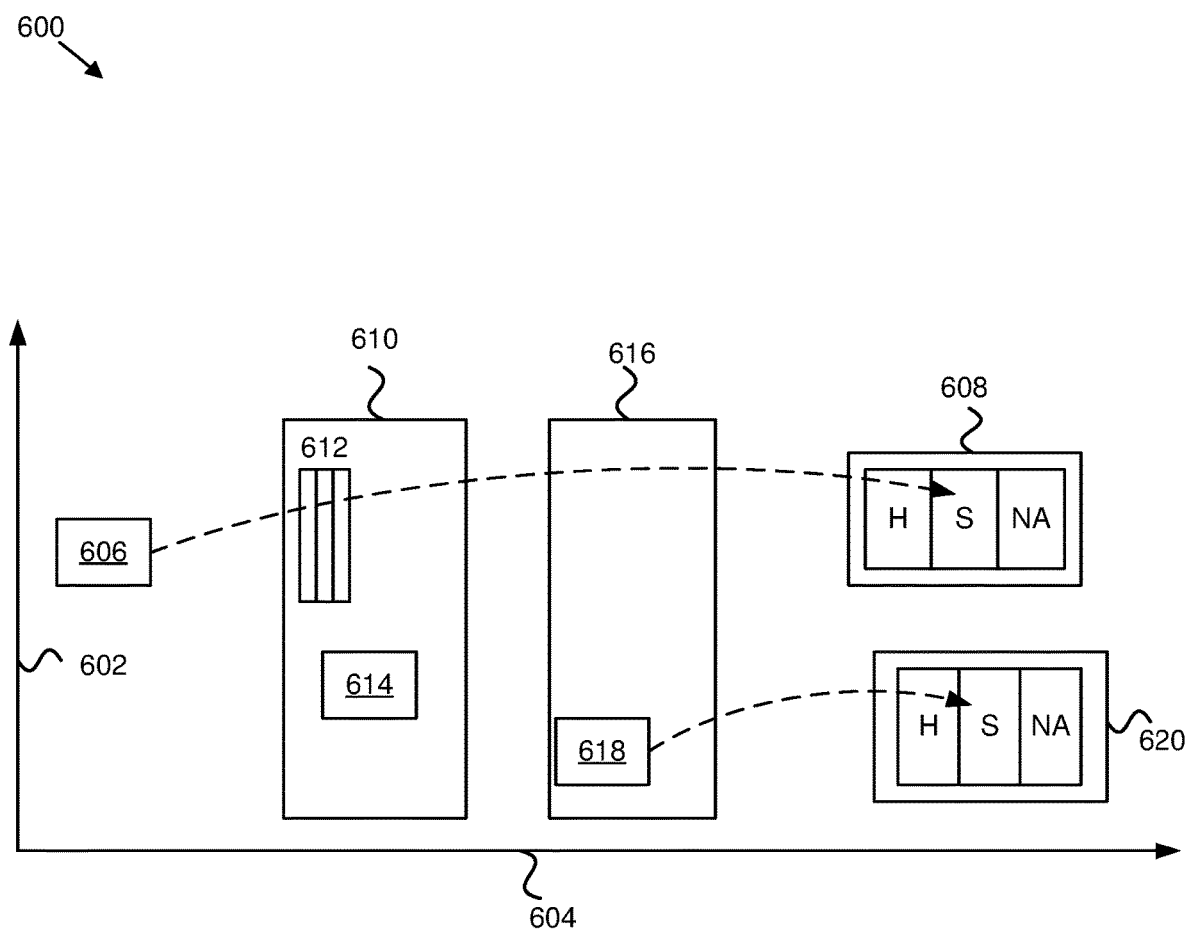
FIG. 6 is a schematic block diagram illustrating one embodiment of a timeline for early interference evaluation.

FIG. 6 is a schematic block diagram 600 illustrating one embodiment of a timeline for early interference evaluation. The timeline is illustrated with respect to a frequency and/or spatial domain 602 and a time domain 604. FIG. 6 illustrates an example of availability indication. Specifically, a first DCI (DCI1) 606 is transmitted and includes first AI (AI1). The first DCI 606 indicates a first resource set and/or subset 608 that may include hard ("H"), soft ("S"), and/or not available ("NA"). In an early interference evaluation phase 610, at least one node transmits reference signals 612 and at least one node receives the reference signals and performs an interference measurement. At least one node may transmit a report 614 based on the interference measurement. Then, based on the measurements and/or measurement reports, a node may transmit control signaling 616 (e.g., an AI message, scheduling message) such as a second DCI (DCI2) 618 message indicating second AI (AI2) and a second resource set and/or subset 620 that may include H, S, and/or NA.

Figure 7:
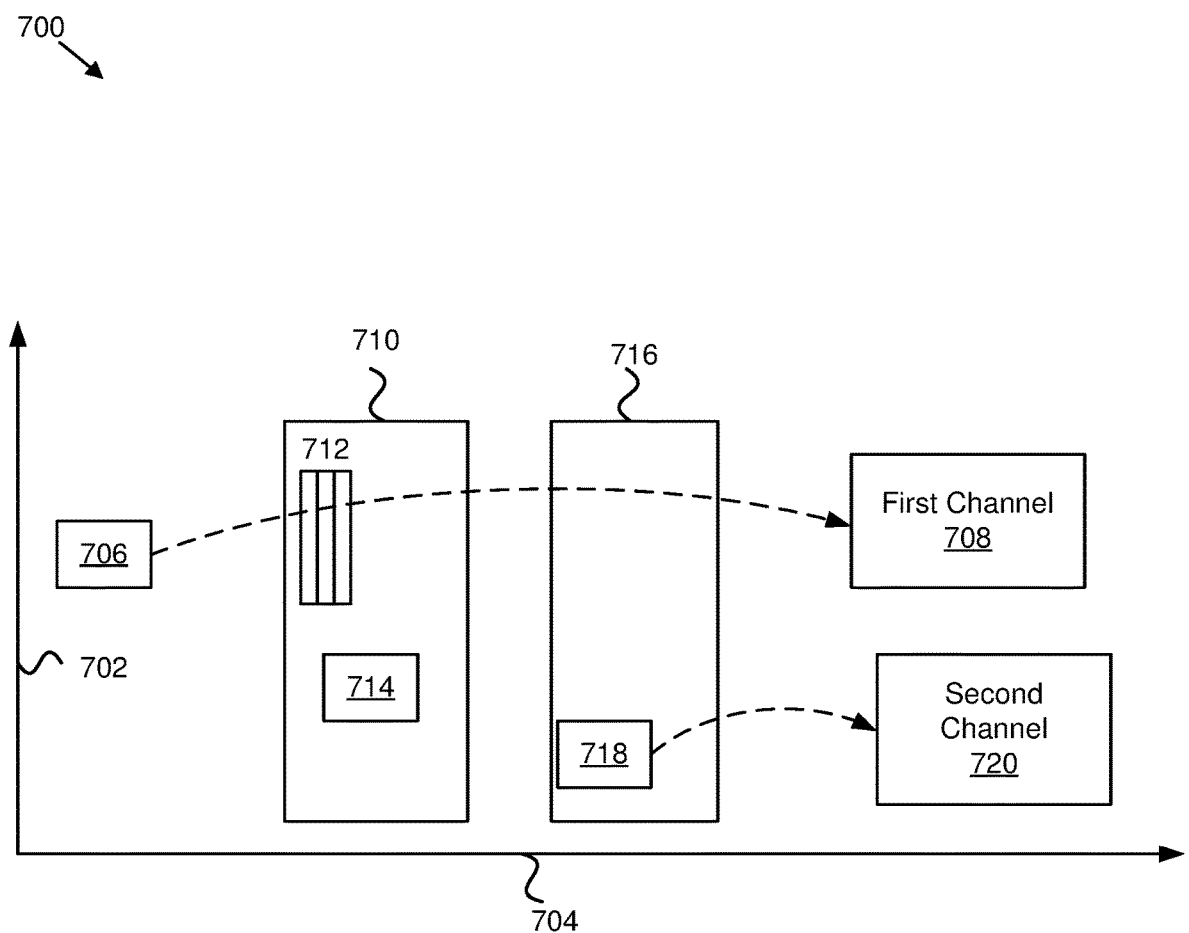
FIG. 7 is a schematic block diagram illustrating another embodiment of a timeline for early interference evaluation.

FIG. 7 is a schematic block diagram 700 illustrating another embodiment of a timeline for early interference evaluation. The timeline is illustrated with respect to a frequency and/or spatial domain 702 and a time domain 704. FIG. 7 illustrates an example for scheduling channels. Specifically, a first DCI (DCI1) 706 is transmitted and includes a first scheduling channel. The first DCI 706 indicates a first channel 708. In an early interference evaluation phase 710, at least one node transmits reference signals 712 and at least one node receives the reference signals and performs an interference measurement. At least one node may transmit a report 714 based on the interference measurement. Then, based on the measurements and/or measurement reports, a node may transmit control signaling 716 (e.g., an AI message, scheduling message) such as a second DCI 718 scheduling a second channel 720 (e.g., for communications with a child node or a UE).

Figure 8:
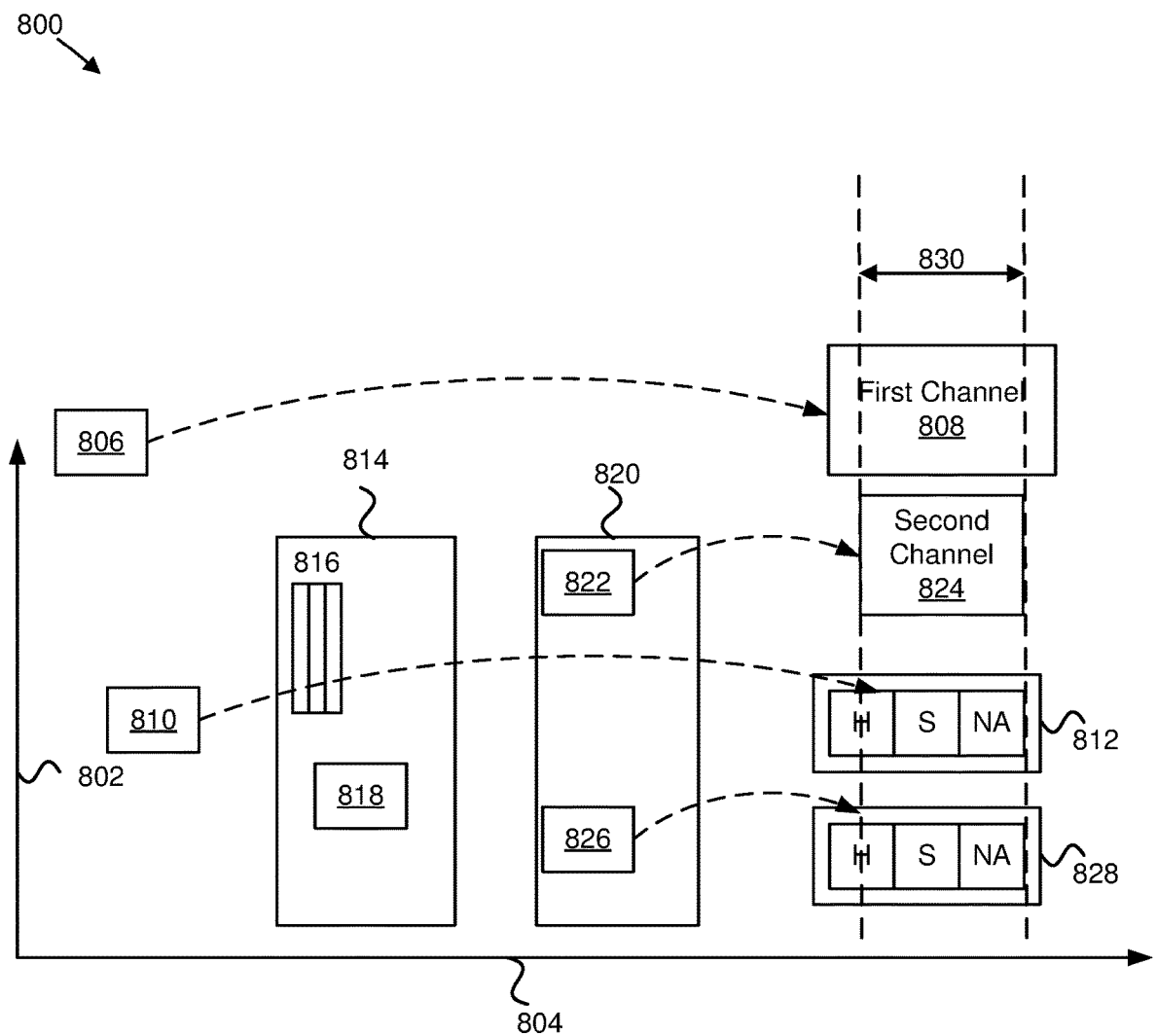
FIG. 8 is a schematic block diagram illustrating a further embodiment of a timeline for early interference evaluation.

FIG. 8 is a schematic block diagram 800 illustrating a further embodiment of a timeline for early interference evaluation. The timeline is illustrated with respect to a frequency and/or spatial domain 802 and a time domain 804. FIG. 8 illustrates a combination of the elements of FIG. 6 and FIG. 7 to enable simultaneous operations based on a prior scheduling and/or a prior availability indication, as well as an early interference evaluation procedure, to schedule a channel or transmit an availability indication on/for overlapping resources. Specifically, a first DCI (DCI1) 806 is transmitted and includes a first scheduling channel. The first DCI 806 indicates a first channel 808. Moreover, a second DCI (DCI2) 810 is transmitted and includes first AI (AI1). The second DCI 810 indicates a first resource set and/or subset 812 that may include hard ("H"), soft ("S"), and/or not available ("NA"). In an early interference evaluation phase 814, at least one node transmits reference signals 816 and at least one node receives the reference signals and performs an interference measurement. At least one node may transmit a report 818 based on the interference measurement. Then, based on the measurements and/or measurement reports, a node may transmit control signaling 820 (e.g., an AI message, scheduling message) such as a third DCI (DCI3) 822 scheduling a second channel 824 (e.g., for communications with a child node or a UE) and a fourth DCI (DCI4) 826 message indicating second AI (AI2) and a second resource set and/or subset 828 that may include H, S, and/or NA. As illustrated, there are overlaps 830 among the first channel 808, the second channel 824, the first resource set and/or subset 812, and the second resource set and/or subset 828.

As illustrated in FIG. 6 through 8, multiplexing of multiple signals or channels may occur on different domains. FDM enables a system to use frequency resources on overlapping time resources. Moreover, TDM may be realized (e.g., in single-panel or multi-panel IAB nodes provided that a sufficient frequency separation among channels or signals is secured by a guard band). The guard band may be specified by a standard, indicated by a node capability signaling, or determined by embodiments described herein. SDM may also be realized (e.g., provided that a sufficient spatial separation of transmissions or receptions is secured by beamforming). The spatial separation may be examined by an implementation-specific method or a standard-based method as found in various embodiments herein. Other multiplexing schemes such as code-division multiplexing ("CDM") may also be used.

Enabling different multiplexing schemes may allow a node to use available resources more efficiently by packing more signals on resources that overlap in the time domain. Two signals may overlap in the time domain if the resources configured for, or allocated to, the signals overlap in the time domain or if the propagation delay between nodes causes a misalignment between reception or transmission times of signals that would otherwise be aligned. The latter case includes scenarios where a timing alignment method are applied to ensure a timing alignment on one node, but cause misalignment on another node due to geometrical asymmetries in the system. Therefore, a system may determine what resources overlap in the time domain prior to employing embodiments described herein. In some embodiments, a guard time may be used to ensure that signals multiplexed in time and/or spatial domains are sufficiently separated from other signals in the time domain. In the examples of FIGS. 6 through 8, a communication may be performed by an IAB node or a user equipment ("UE").

Figure 9:
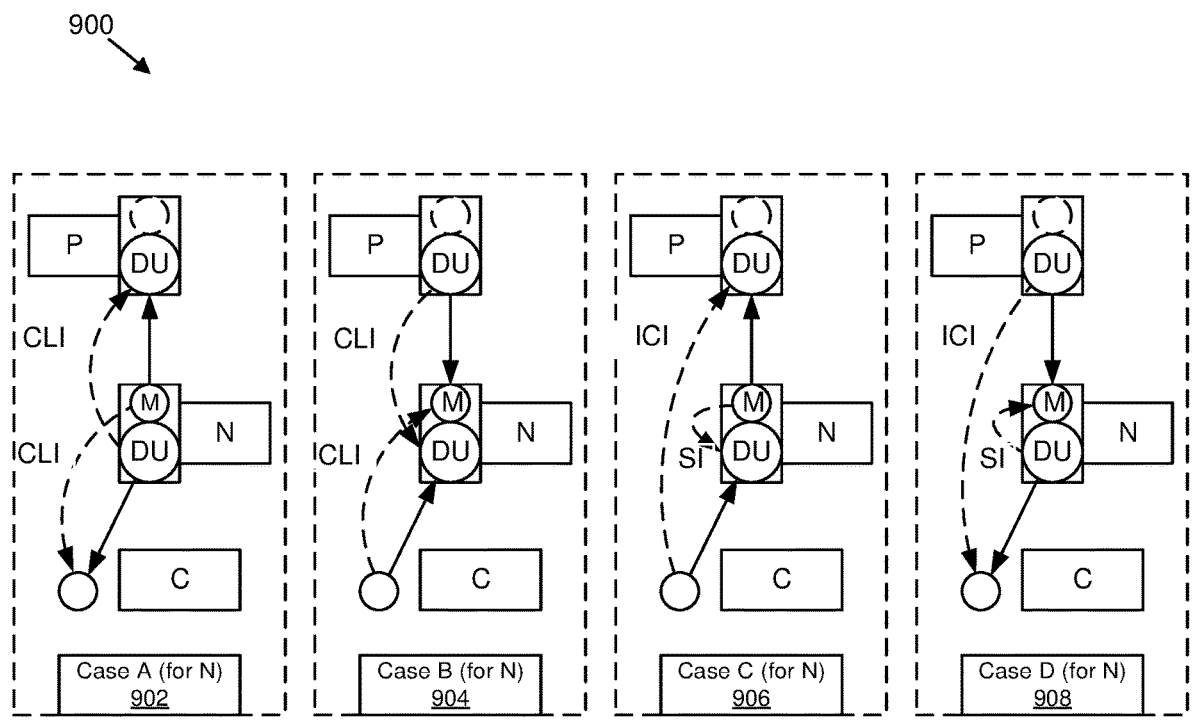
FIG. 9 is a schematic block diagram illustrating one embodiment of a system having multi-hop IAB.

FIG. 9 is a schematic block diagram illustrating one embodiment of a system 900 having multi-hop IAB. The system 900 illustrates a Case A 902, a Case B 904, a Case C 906, and a Case D 908. In these cases, P is a parent node of N, C is a child node of N, and N is a subject node. Four different scenarios are identified and different types of interference—CLI, ICI, and SI—are illustrated. In FIG. 9, "M" represents a MT.

In some embodiments described herein, FDM and/or SDM may be enabled by performing an early interference evaluation and allowing simultaneous operations (e.g., transmissions and/or receptions) if the mutual interference between the operations is not prohibitive.

In various embodiments, each of the parent node (P), the subject node (N), and the child node (C) may be an IAB node. In certain embodiments, P may be an IAB donor or a gNB, and/or C may be a UE or an enhanced UE. An IAB-MT of N may be referred to as "N-MT" and an IAB-DU of N may be referred to as "N-DU". In some embodiments, P may refer to an "IAB-DU" of a parent node and/or C may refer to an "IAB-MT" of a child node.

In certain embodiments, prior to communication methods described for each of the following cases, each of P, N, and C may receive resource configurations indicating which resources are uplink ("UL"), downlink ("DL"), or flexible ("F"), as well as which resources are hard ("H"), soft ("S"), or not available ("NA"). In some embodiments, lower layer signaling such as DCI messages for scheduling and availability indication may also precede communication methods described herein.

In various embodiments, configurations may include parameters indicating resources used for a communication, a beam applied for a transmission or a reception, a transmission power to apply for a transmission, a timing alignment method applied for a transmission or a reception, and so forth. It should be noted that, a beam may refer to a spatial filter for a transmission or a reception by a node on an antenna panel or antenna port.

As used herein, a beam may be referred to by a term such as a spatial filter or spatial parameters. Moreover, a transmission and/or reception of a signal with a beam may refer to application of a spatial filter (or spatial parameters) similar to that of another transmission and/or reception of another signal. "Determining" a beam may follow a beamforming training process including transmission and/or reception of reference signals by applying different beams and performing measurements on the signals. "Indicating" a beam may refer to transmitting a message to another node, the message including information of a beam and/or spatial filter in the form of a transmission configuration indication ("TCI") including a spatial quasi collocation ("QCL"), a QCL Type D, a spatial relation parameter, and so forth.

Further, as used herein, a transmission power may be determined or indicated by signaling. The signaling may be semi-static such as by an RRC configuration and/or a control message such as a MAC CE message or a DCI and/or layer 1 ("L1") message. Transmission power control may be applied to uplink transmissions, downlink transmissions, or both, which may be determined by a standard, a configuration, and/or control signaling.

Moreover, as used herein, a timing alignment method may be determined or indicated by signaling. The signaling may be semi-static such as by an RRC configuration and/or a control message such as a MAC CE message or a DCI and/or L1 message. In some embodiments, a timing alignment method may be determined by a duplexing and/or multiplexing case. For example, Case A (e.g., simultaneous transmission) at a node may automatically trigger a timing alignment mode based on a timing alignment, where transmissions are aligned, whereas Case B (e.g., simultaneous reception) at a node may automatically trigger a timing alignment mode based on a timing alignment, where receptions are aligned. Whether and how a timing alignment method is triggered or applied may be determined by a standard, a configuration, and/or control signaling.

In various embodiments, a parameter may be determined based on another parameter. For example, a power control parameter or a timing alignment method and/or parameter may be determined based on a beam index such as a reference signal resource indicator.

As used herein, {beam, power, timing} may refer to the way one or more parameters associated with beam, power, and timing may be set. In certain embodiments, one or more of the parameters may be set or omitted based on specifications, configurations, and/or signaling. In some embodiments, other such parameters may be controlled as well. Moreover, {beam, power, timing} parameters may be controlled for a transmission while {beam, timing} parameters may be controlled for a reception.

A summary of one embodiment of Case A is shown in Table 2 in which there may be CLI from N-MT on C.

TABLE 2

- P schedules UL/PUSCH for N-MT
- N-MT transmits SRS with {indicated beam, signaled power}
- C measures CLI with {latest beam}
- C transmits report to N-DU
- N-DU schedules DL/PDSCH for C In some embodiments of Case A, P transmits a DCI message scheduling a UL channel such as a PUSCH for N-MT. Then, N-MT transmits an SRS with {beam=b, power=p, timing=t}, where: b is indicated by a spatial information parameter for a latest UL communication to P, based on SRS-spatial relation information, TCI state configured, indicated, and/or provided by P for the SRS transmission, or based on the scheduling information (e.g., beam and/or spatial information (e.g., SRI), TCI-state) received for the UL and/or PUSCH; p is signaled by P and/or configured by the network; t is signaled by P and/or determined according to Case A (e.g., a timing alignment) and/or configured by the network. The values of {b, p, t} may be associated with a hard resource, a soft resource, or a soft resource that is indicated available.

If N-MT may be served by multiple parent nodes P, N-MT may transmit multiple SRSs while applying multiple beams indicated and/or applied for latest UL transmissions to the multiple parent nodes. While N-MT transmits the SRS, C performs a CLI measurement on the SRS resources. C may apply a beam indicated and/or applied for a latest DL reception from N-DU. If C is served by multiple parent nodes N-DU, C may perform CLI measurements on multiple SRS resources while applying multiple beams indicated and/or applied for DL receptions from the multiple parent nodes. C transmits a report comprising information of the CLI measurement to N-DU. Based on the measurement report, N-DU may transmit a DCI message scheduling a DL channel such as a PDSCH for C.

A summary of another embodiment of Case A is shown in Table 3 in which there may be CLI from N-DU on P.

TABLE 3

- P transmits AI for DL-S to N for C
- N-DU transmits CSI-RS with {determined beam, determined power}
- P measures CLI with {determined beam}
- P transmits AI for DL-S to N for C <AND/OR> P schedules UL/PUSCH for N-MT In various embodiments, P transmits a DCI message including an AI for DL resources of N-DU that are soft. Then, N-DU transmits a CSI-RS with {beam=b, power=p, timing=t}, where: b is determined for a DL communication to C or based on a TCI-state configured, indicated, and/or provided for providing a QCL source and QCL type (e.g., QCL-TypeD) for the CSI-RS transmission; p is determined by N-DU and/or configured by the network; is signaled by P and/or determined according to Case A (e.g., a timing alignment) and/or configured by the network. The values of {b, p, t} may be associated with a hard resource, a soft resource, or a soft resource that is indicated available. If N-DU may serve multiple child nodes C, N-DU may transmit multiple CSI-RSs while applying multiple beams determined for DL transmissions to the multiple child nodes.

While N-DU transmits the CSI-RS, P performs a CLI measurement on the CSI-RS resources. P may apply a beam determined for a UL reception from N-MT. If P may serve multiple child nodes N-MT, P may perform CLI measurements on multiple CSI-RS resources while applying multiple beams determined for UL receptions from the multiple child nodes. Based on the measurement results, P may transmit a DCI message comprising an AI for DL resources of N-DU that are soft and/or transmit a DCI message scheduling a UL channel such as a PUSCH for N-MT.

A summary of one embodiment of Case B is shown in Table 4 in which there may be CLI from C on N-MT.

TABLE 4

- P schedules DL/PDSCH for N-MT
- C transmits SRS for UL-S/H with {latest beam, signaled power}
- N-MT measures CLI with {indicated beam}
- N-DU schedules UL/PUSCH for C In certain embodiments, P transmits a DCI message scheduling a DL channel such as a PDSCH for N-MT. Then, C transmits an SRS with {beam=b, power=p, timing=t}, where: b is indicated by a spatial information parameter, such as a TCI, in the DCI message, based on SRS-spatial relation information, or TCI state configured, indicated, and/or provided by N-DU for the SRS transmission; p is signaled by N-DU and/or configured by the network; t is signaled by N-DU and/or determined according to Case B (e.g., a timing alignment) and/or configured by the network. The values of {b, p, t} may be associated with a hard resource, a soft resource, or a soft resource that is indicated available.

If C may be served by multiple parent nodes N-DU, C may transmit multiple SRSs while applying multiple beams indicated and/or applied for latest UL transmissions to the multiple parent nodes. While C transmits the SRS, N-MT performs a CLI measurement on the SRS resources. N-MT may apply a beam indicated and/or applied for a latest DL reception from P. If N-MT is served by multiple parent nodes P, N-MT may perform CLI measurements on multiple SRS resources while applying multiple beams indicated and/or applied for DL receptions from the multiple parent nodes. Based on the measurement results, N-DU may transmit a DCI message scheduling a UL channel such as a PUSCH for C.

A summary of another embodiment of Case B is shown in Table 5 in which there may be CLI from P on N-DU.

TABLE 5

- P transmits CSI-RS for DL-S/H with {determined beam, determined power}
- N-DU measures CLI with {determined beam}
- N-MT transmits report to P
- P transmits AI for UL-S to N for C <AND/OR> P schedules DL/PDSCH for N-MT In some embodiments, P transmits a CSI-RS with {beam=b, power=p, timing=t}, where: b is determined for a DL communication to N-DU or based on a TCI-state configured, indicated, provided for providing a QCL source and QCL type (e.g., QCL-TypeD) for the CSI-RS transmission; p is determined by P and/or configured by the network; t is determined according to Case B (e.g., a timing alignment) and/or configured by the network. The values of {b, p, t} may be associated with a hard resource, a soft resource, or a soft resource that is indicated available.

If P may serve multiple child nodes N-MT, P may transmit multiple CSI-RSs while applying multiple beams determined for DL transmissions to the multiple child nodes. While P transmits the CSI-RS, N-DU performs a CLI measurement on the CSI-RS resources. N-DU may apply a beam determined for a UL reception from C. If N-DU may serve multiple child nodes C, N-DU may perform CLI measurements on multiple CSI-RS resources while applying multiple beams determined for UL receptions from the multiple child nodes. N-MT transmits a report including information of the CLI measurement to P. Based on the measurement report, P may transmit a DCI message including an AI for DL resources of N that are soft and/or transmit a DCI message scheduling a DL channel such as a PDSCH for N-MT.

A summary of one embodiment of Case C is shown in Table 6 in which there may be ICI from C on P.

TABLE 6

- C transmits SRS for UL-S/H with {latest beam, signaled power}
- P measures ICI with {determined beam}
- P transmits AI for UL-S to N for C <AND/OR> P schedules UL/PUSCH for N-MT In certain embodiments, C transmits an SRS with {beam=b, power=p, timing=t}, where: b is indicated by a spatial information parameter for a latest UL communication to N-DU or based on SRS-spatial relation information or TCI state configured, indicated, and/or provided by N-DU for the SRS transmission; p is signaled by N-DU and/or configured by the network; t is signaled by N-DU and/or configured by the network. The values of {b, p, t} may be associated with a hard resource, a soft resource, or a soft resource that is indicated available.

If C may be served by multiple parent nodes N-DU, C may transmit multiple SRSs while applying multiple beams indicated and/or applied for latest UL transmissions to the multiple parent nodes. While C transmits the SRS, P performs an ICI measurement on the SRS resources. P may apply a beam determined for a UL reception from N-MT. If P may serve multiple child nodes N-DU, P may perform ICI measurements on multiple SRS resources while applying multiple beams determined for DL receptions from the multiple child nodes. Based on the measurement results, P may transmit a DCI message comprising an AI for UL resources of N that are soft and/or transmit a DCI scheduling a UL channel such as a PUSCH for N-MT.

A summary of another embodiment of Case C is shown in Table 7 in which there may be SI from N-MT on N-DU.

TABLE 7

- N-MT transmits SRS for UL-H/S with {latest beam, signaled power}
- N-DU measures SI with {determined beam}
- N-DU schedules UL/PUSCH for C In some embodiments, N-MT transmits an SRS with {beam=b, power=p, timing=t}, where: b is indicated by a spatial information parameter for a latest UL communication P; p is signaled by P and/or configured by the network; t is signaled by P and/or configured by the network. The values of {b, p, t} may be associated with a hard resource, a soft resource, or a soft resource that is indicated available.

If N-MT may be served by multiple parent nodes P, N-MT may transmit multiple SRSs while applying multiple beams indicated and/or applied for latest UL transmissions to the multiple parent nodes. While N-MT transmits the SRS, N-DU performs an SI measurement on the SRS resources. N-DU may apply a beam determined for a UL reception from C. If N-DU may serve multiple child nodes C, N-DU may perform SI measurements on multiple SRS resources while applying multiple beams determined for UL receptions from the multiple child nodes. Based on the measurement results, N-DU may transmit a DCI message scheduling a UL channel such as a PUSCH for C.

A summary of one embodiment of Case D is shown in Table 8 in which there may be ICI from P on C.

TABLE 8

- P schedules DL for N
- P transmits CSI-RS with {determined (same) beam, power}

TABLE 8-continued

- C measures ICI with {latest beam}
- C transmits report to N
- N-DU schedules DL/PDSCH for C In various embodiments, P transmits a DCI message scheduling a DL channel such as a PDSCH for N-MT. Then, P transmits a CSI-RS with {beam=b, power=p, timing=t}, where: b is determined for a DL communication to N-MT (same as the TCI state in the aforementioned DCI message) or used on a TCI-state configured, indicated, and/or provided for providing a QCL source and QCL type (e.g., QCL-TypeD) for the CSI-RS transmission; p is determined by P and/or configured by the network; t is determined by P and/or configured by the network. The values of {b, p, t} may be associated with a hard resource, a soft resource, or a soft resource that is indicated available.

If P may serve multiple child nodes N-MT, P may transmit multiple CSI-RSs while applying multiple beams determined for DL transmissions to the multiple child nodes. While P transmits the CSI-RS, C performs an ICI measurement on the CSI-RS resources. C may apply a beam indicated and/or applied for a latest DL reception from N-DU. If C is served by multiple parent nodes N-DU, C may perform ICI measurements on multiple CSI-RS resources while applying multiple beams indicated and/or applied for DL receptions from the multiple parent nodes. C transmits a report comprising information of the ICI measurement to N-DU. Based on the measurement report, N-DU may transmit a DCI message scheduling a DL channel such as a PDSCH for C.

A summary of another embodiment of Case D is shown in Table 9 in which there may be SI from N-DU on N-MT.

TABLE 9

- N-DU transmits CSI-RS for DL-S/H with {determined beam, determined power}
- N-MT measures SI with {latest beam}
- N-MT transmits report to P
- P transmits AI for DL-S to N for C <AND/OR> P schedules DL/PDSCH for N-MT In certain embodiments, N-DU transmits a CSI-RS with {beam=b, power=p, timing=t}, where: b is determined for a DL communication to C; p is determined by N and/or configured by the network; t is signaled by P and/or configured by the network. The values of {b, p, t} may be associated with a hard resource, a soft resource, or a soft resource that is indicated available.

If N-DU may serve multiple child nodes C, N-DU may transmit multiple CSI-RSs while applying multiple beams determined for DL transmissions to the multiple child nodes. While N-DU transmits the CSI-RS, N-MT performs an SI measurement on the CSI-RS resources. N-MT may apply a beam indicated and/or applied for a latest DL reception from P. If N-MT is served by multiple parent nodes P, N-MT may perform SI measurements on multiple CSI-RS resources while applying multiple beams indicated and/or applied for DL receptions from the multiple parent nodes. N-MT transmits a report comprising information of the SI measurement to P. Based on the measurement report, P may transmit a DCI message comprising an AI for DL resources of N that are soft and/or P may transmit a DCI message scheduling a DL channel such as a PDSCH for N-MT.

In some embodiments, a node performing an interference measurement or receiving a measurement report may take other actions such as proceeding with communication on a scheduled channel, scheduling a "pre-scheduled" channel, canceling or rejecting a scheduled communication, triggering transmission of a signal such as a reference signal, performing a link adaptation, and so forth.

Various methods are described herein in relation to flow charts, in the flow charts "DLR" stands for downlink resource and "ULR" stands for uplink resource. Each of the downlink resources or uplink resources may be configured as hard or soft in different embodiments. Resources may overlap in a time-domain without an explicit indication, hence adopting an early interference evaluation for making a decision on whether two (or multiple) operations may be performed on the resources simultaneously. Physical shared channels such as PDSCH and PUSCH may be scheduled for communication on the resources as examples. Other channels or signals may also be used.

Furthermore, "PBD" stands for P's beam for downstream; "NBU" stands for N's beam for upstream; "NBD" stands for N's beam for downstream; and "CBU" stands for C's beam for upstream. An example of beam orientations is illustrated in FIG. 10.

Figure 10:
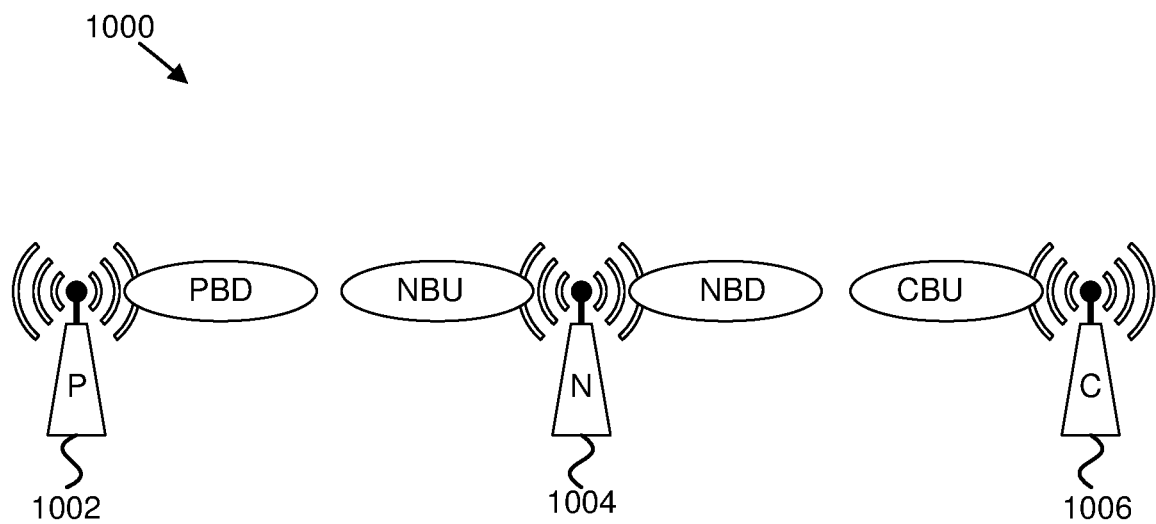
FIG. 10 is a schematic block diagram illustrating one embodiment of communications in a system.

Specifically, FIG. 10 is a schematic block diagram illustrating one embodiment of communications in a system 1000 (e.g., including an example of beam orientations in a multi-hop IAB system). The system includes a P 1002 node, an N 1004 node, and a C 1006 node.

In certain embodiments, the beams (e.g., spatial filters or spatial parameters) PBD and NBU may form a beam pair. Similarly, the beams NBD and CBU may form a beam pair.

In some embodiments, depending on whether each of the operations by a node is a transmission or a reception, each of PBD, NBU, NBD, and CBU may be a transmit beam (e.g., spatial filter or spatial parameter) or a receive beam applied on one or multiple antenna panels. Whether a beam is a transmit beam or a receive beam, if not mentioned explicitly, may be understood from the simultaneous operation case. In various embodiments, a spatial parameter may not only determine a spatial filter to be applied on one or multiple panels for a transmission or a reception, but also determine the one or multiple panels.

In each example flowchart herein, if a method includes an element "transmit a spatial parameter," the element may be realized as one of the following: 1) transmitting a spatial parameter in a DCI message that has scheduled a channel prior to a reference signal transmission or reception in the proposed method—the node transmitting the spatial parameter may not have explicitly transmitted an indication that the spatial parameter is to be used in the method; 2) transmitting a spatial parameter via a control signaling, a configuration, or the like—the node transmitting the spatial parameter may have explicitly transmitted an indication that the spatial parameter is to be used in the method; and 3) transmitting a spatial parameter in a DCI message that "pre-schedules" a channel A pre-scheduled channel may be a tentatively scheduled channel that may or may not be scheduled by a DCI message at a later time. Scheduling a pre-scheduled channel may depend on the outcome of an early interference measurement process. In certain embodiments, the DCI message may include an early beam (e.g., TCI state) indication for a channel that may be scheduled by another DCI message later.

Furthermore, if a method includes an element "receive a spatial parameter," the element may be realized by one of the following: 1) receiving a spatial parameter in a DCI message that has scheduled a channel prior to a reference signal transmission or reception in the proposed method—the node receiving the spatial parameter may not have explicitly received an indication that the spatial parameter is to be used in the method, hence, the node may implicitly use the spatial parameter based on a standard specification, a configuration, or the like—one example method is to use the spatial parameter indicated in a latest communication with the node that has transmitted the spatial parameter; 2) receiving a spatial parameter via a control signalling, a configuration, or the like—the node receiving the spatial parameter may have explicitly received an indication that the spatial parameter is to be used in the method; and 3) receiving a spatial parameter in a DCI message that "pre-schedules" a channel A pre-scheduled channel may be a tentatively scheduled channel that may or may not be scheduled by a DCI message at a later time. Scheduling a pre-scheduled channel may depend on the outcome of an early interference measurement process. In some embodiments, the DCI message may include an early beam (e.g., TCI state) indication for a channel that may be scheduled by another DCI message later.

In various embodiments, despite an emphasis on beamforming (e.g., spatial parameters) certain embodiments, power control and timing alignment control may also be applicable to each example explained herein. Power control and timing alignment control may be omitted for the sake of brevity. However, it should be noted that power control and timing alignment control by configurations and/or signaling, which may be beam-specific (e.g., jointly specified by spatial parameter control) and/or case specific (e.g., determined by whether each of the simultaneous operations is a transmission or a reception), may also be in some embodiments.

For Case A there may be CLI from N-MT on C.

Figure 11:
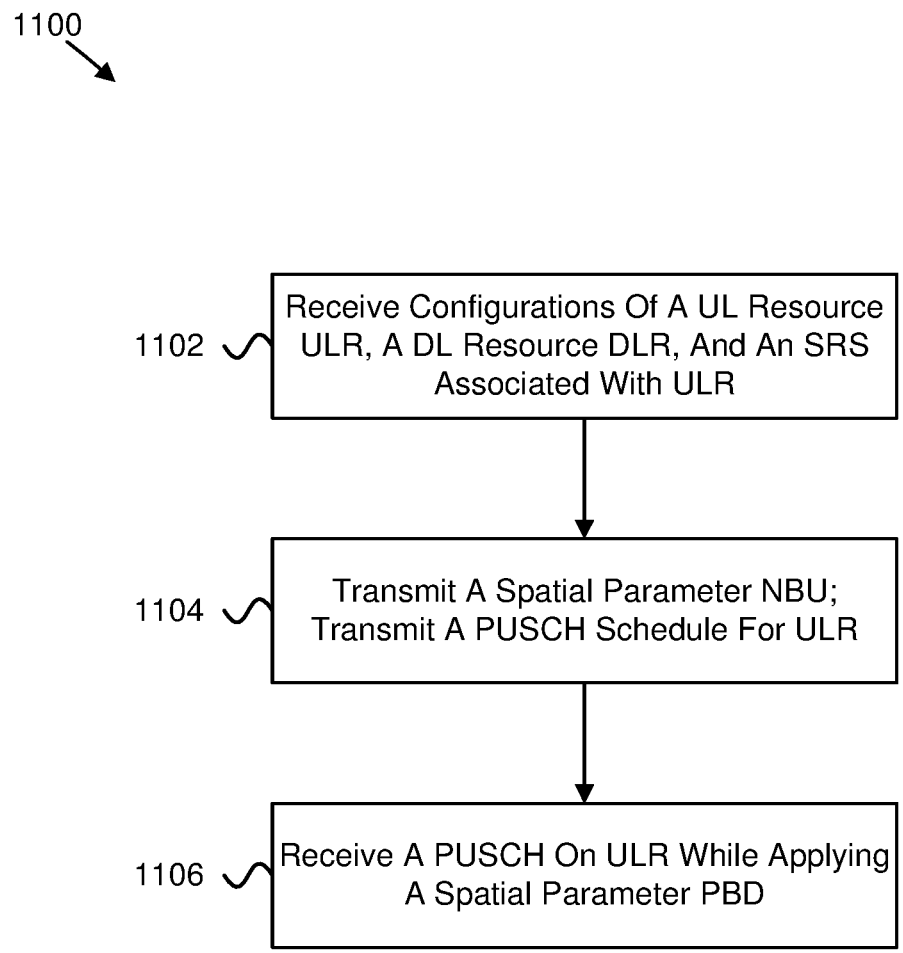
FIG. 11 is a flow chart diagram illustrating one embodiment of a method for P for Case A in which there may be CLI from N-MT on C.

FIG. 11 is a flow chart diagram illustrating one embodiment of a method 1100 for P for Case A in which there may be CLI from N-MT on C. The method 1100 includes receiving 1102 configurations of a UL resource ULR, a DL resource DLR, and an SRS associated with ULR. The method 1100 also includes transmitting 1104 a spatial parameter NBU and transmitting a PUSCH schedule for ULR. Moreover, the method 1100 includes receiving 1106 a PUSCH on ULR while applying a spatial parameter PBD.

Figure 12:
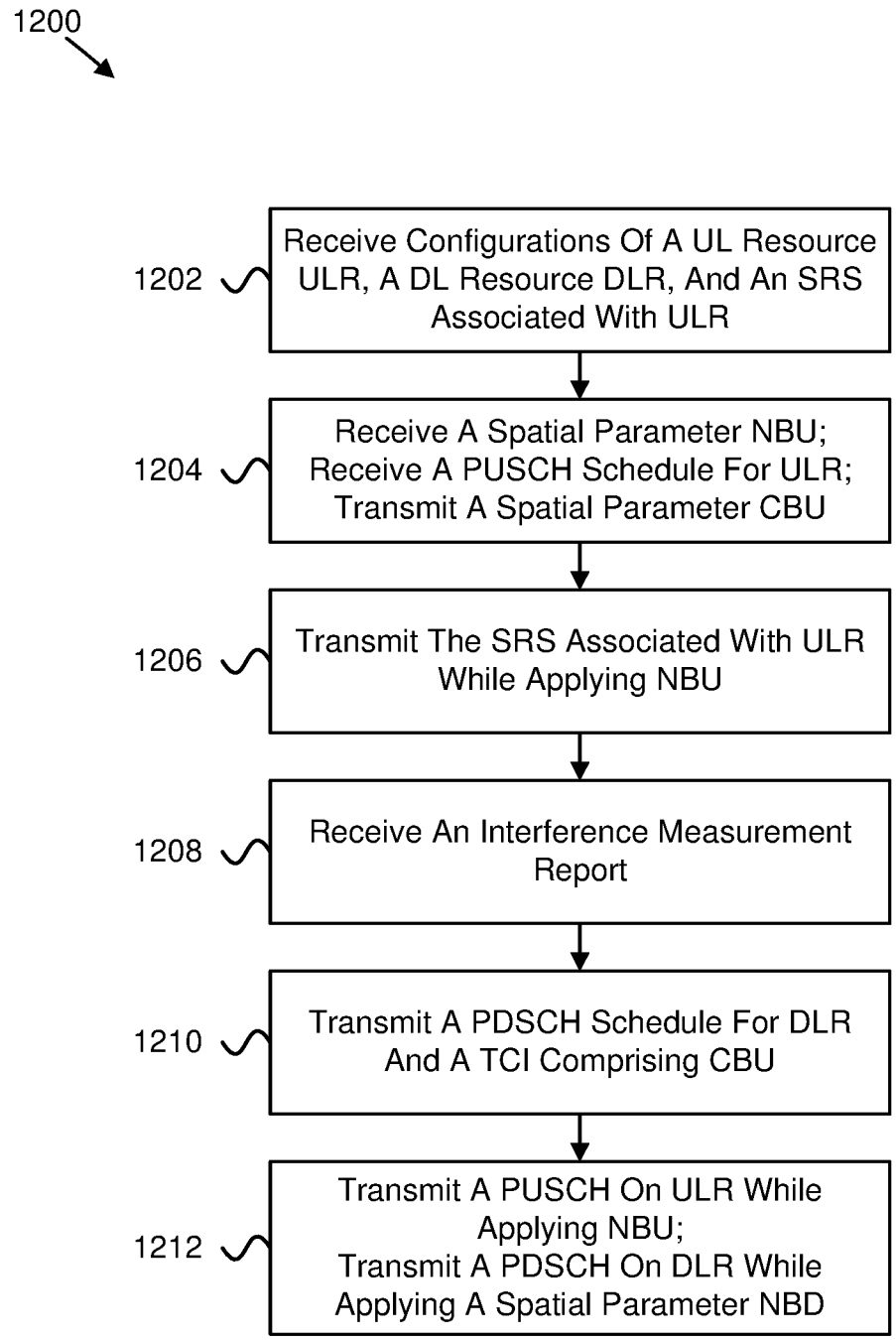
FIG. 12 is a flow chart diagram illustrating one embodiment of a method for N for Case A in which there may be CLI from N-MT on C.

FIG. 12 is a flow chart diagram illustrating one embodiment of a method 1200 for N for Case A in which there may be CLI from N-MT on C. The method 1200 includes receiving 1202 configurations of a UL resource ULR, a DL resource DLR, and an SRS associated with ULR. The method 1200 also includes receiving 1204 a spatial parameter NBU, receiving a PUSCH schedule for ULR, and transmitting a spatial parameter CBU. The method 1200 includes transmitting 1206 the SRS associated with ULR while applying NBU. The method 1200 also includes receiving 1208 an interference measurement report. The method 1200 includes transmitting 1210 a PDSCH schedule for DLR and a TCI comprising CBU. The method 1200 also includes transmitting 1212 a PUSCH on ULR while applying NBU and transmitting a PDSCH on DLR while applying a spatial parameter NBD.

Figure 13:
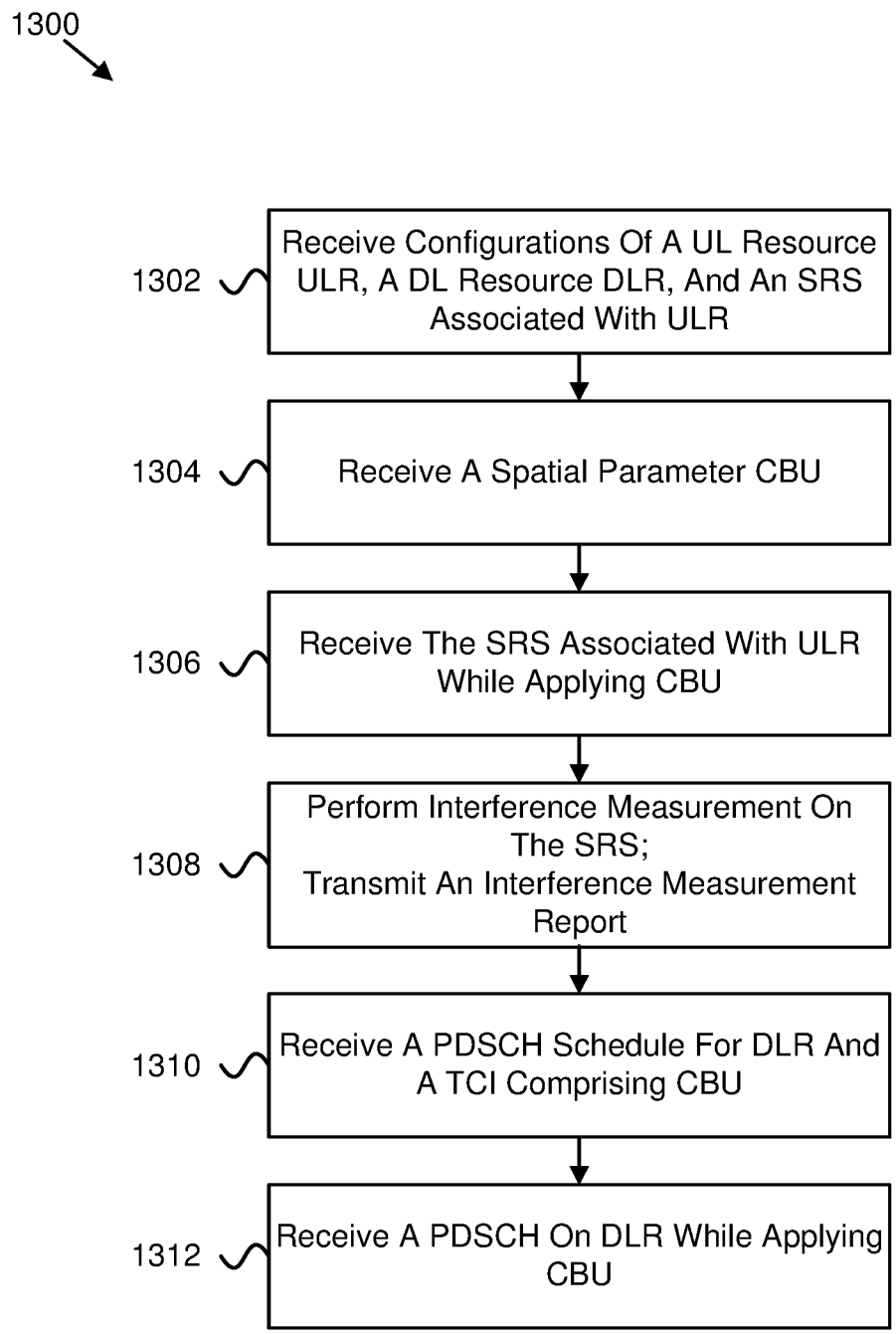
FIG. 13 is a flow chart diagram illustrating one embodiment of a method for C for Case A in which there may be CLI from N-MT on C.

FIG. 13 is a flow chart diagram illustrating one embodiment of a method 1300 for C for Case A in which there may be CLI from N-MT on C. The method 1300 includes receiving 1302 configurations of a UL resource ULR, a DL resource DLR, and an SRS associated with ULR. The method 1300 also includes receiving 1304 a spatial parameter CBU. The method 1300 includes receiving 1306 the SRS associated with ULR while applying CBU. The method 1300 also includes performing 1308 interference measurement on the SRS and transmitting an interference measurement report. The method 1300 includes receiving 1310 a PDSCH schedule for DLR and a TCI comprising CBU. The method 1300 also includes receiving 1312 a PDSCH on DLR while applying CBU.

In FIGS. 11 through 13, PBD is a receive beam; NBU is a transmit beam; NBD is a transmit beam; and CBU is a receive beam.

For Case A there may be CLI from N-DU on P.

Figure 14:
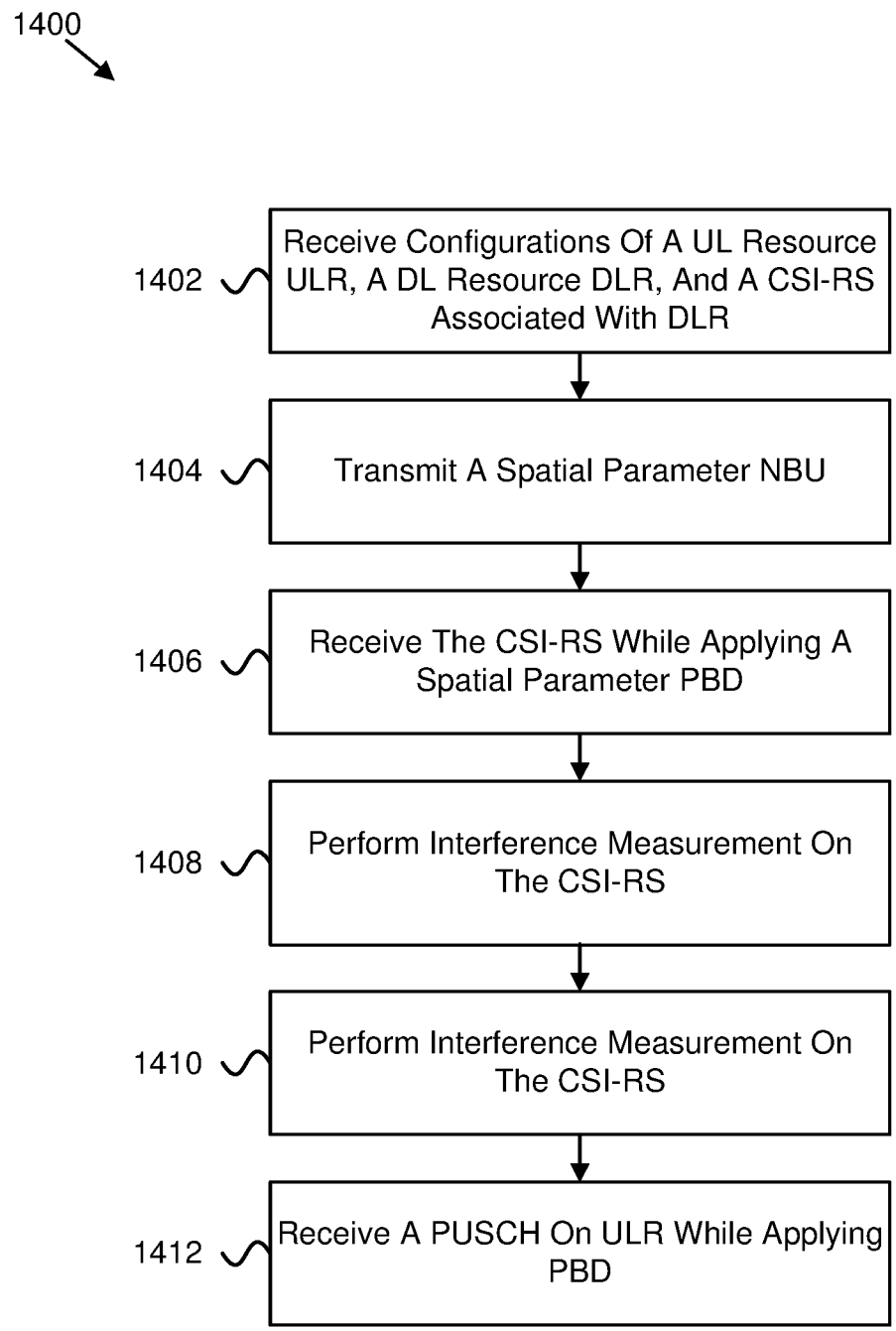
FIG. 14 is a flow chart diagram illustrating one embodiment of a method for P for Case A in which there may be CLI from N-DU on P.

FIG. 14 is a flow chart diagram illustrating one embodiment of a method 1400 for P for Case A in which there may be CLI from N-DU on P. The method 1400 includes receiving 1402 configurations of a UL resource ULR, a DL resource DLR, and a CSI-RS associated with DLR. The method 1400 also includes transmitting 1404 a spatial parameter NBU. The method 1400 includes receiving 1406 the CSI-RS while applying a spatial parameter PBD. The method 1400 also includes performing 1408 interference measurement on the CSI-RS. The method 1400 includes transmitting 1410 an AI for DLR and transmitting a PUSCH schedule for ULR. The method 1400 also includes receiving 1412 a PUSCH on ULR while applying PBD.

Figure 15:
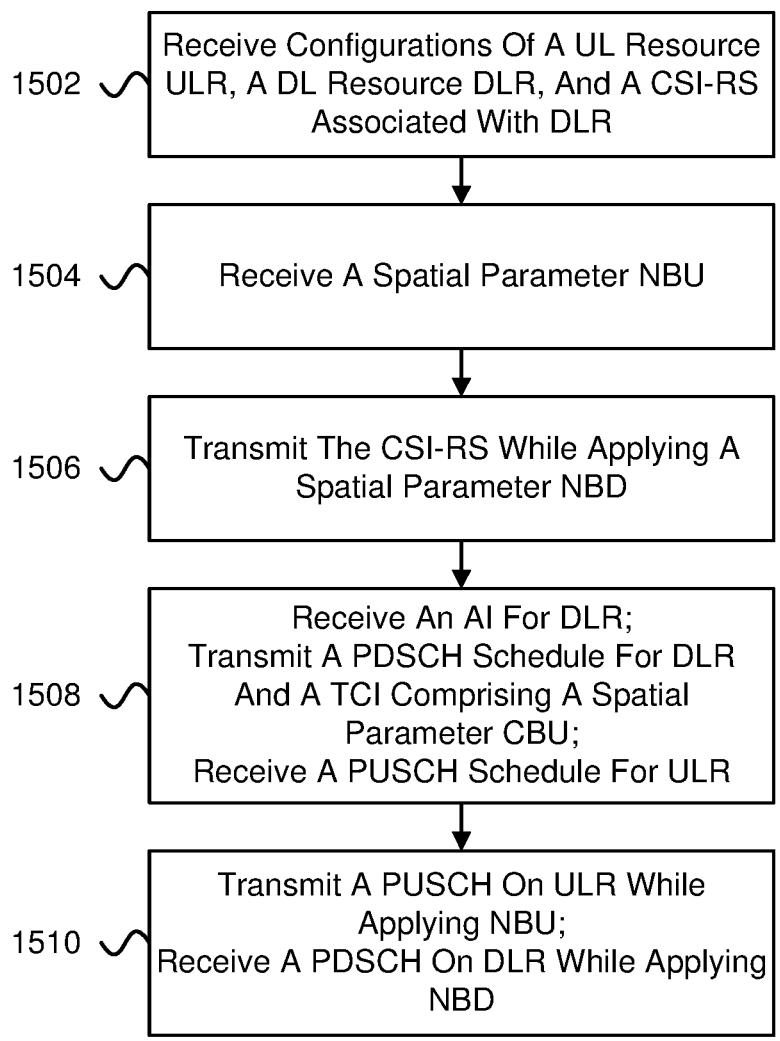
FIG. 15 is a flow chart diagram illustrating one embodiment of a method for N for Case A in which there may be CLI from N-DU on P.

FIG. 15 is a flow chart diagram illustrating one embodiment of a method 1500 for N for Case A in which there may be CLI from N-DU on P. The method 1500 includes receiving 1502 configurations of a UL resource ULR, a DL resource DLR, and a CSI-RS associated with DLR. The method 1500 also includes receiving 1504 a spatial parameter NBU. The method 1500 includes transmitting 1506 the CSI-RS while applying a spatial parameter NBD. The method 1500 also includes receiving 1508 an AI for DLR, transmitting a PDSCH schedule for DLR and a TCI comprising a spatial parameter CBU, and receiving a PUSCH schedule for ULR. The method 1500 includes transmitting 1510 a PUSCH on ULR while applying NBU and receiving a PDSCH on DLR while applying NBD.

Figure 16:
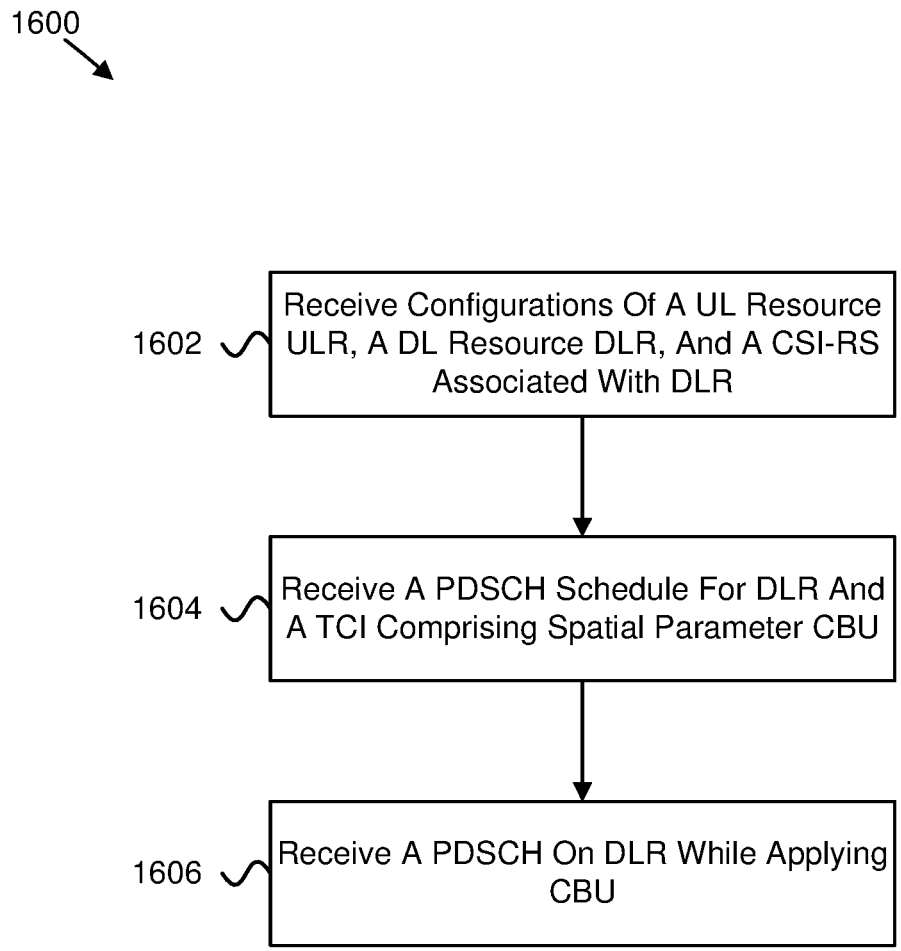
FIG. 16 is a flow chart diagram illustrating one embodiment of a method for C for Case A in which there may be CLI from N-DU on P.

FIG. 16 is a flow chart diagram illustrating one embodiment of a method 1600 for C for Case A in which there may be CLI from N-DU on P. The method 1600 includes receiving 1602 configurations of a UL resource ULR, a DL resource DLR, and a CSI-RS associated with DLR. The method 1600 also includes receiving 1604 a PDSCH schedule for DLR and a TCI comprising spatial parameter CBU. Moreover, the method 1600 includes receiving 1606 a PDSCH on DLR while applying CBU.

In FIGS. 14 through 16, PBD is a receive beam; NBU is a transmit beam; NBD is a transmit beam; and CBU is a receive beam.

For Case B there may be CLI from C on N-MT.

Figure 17:
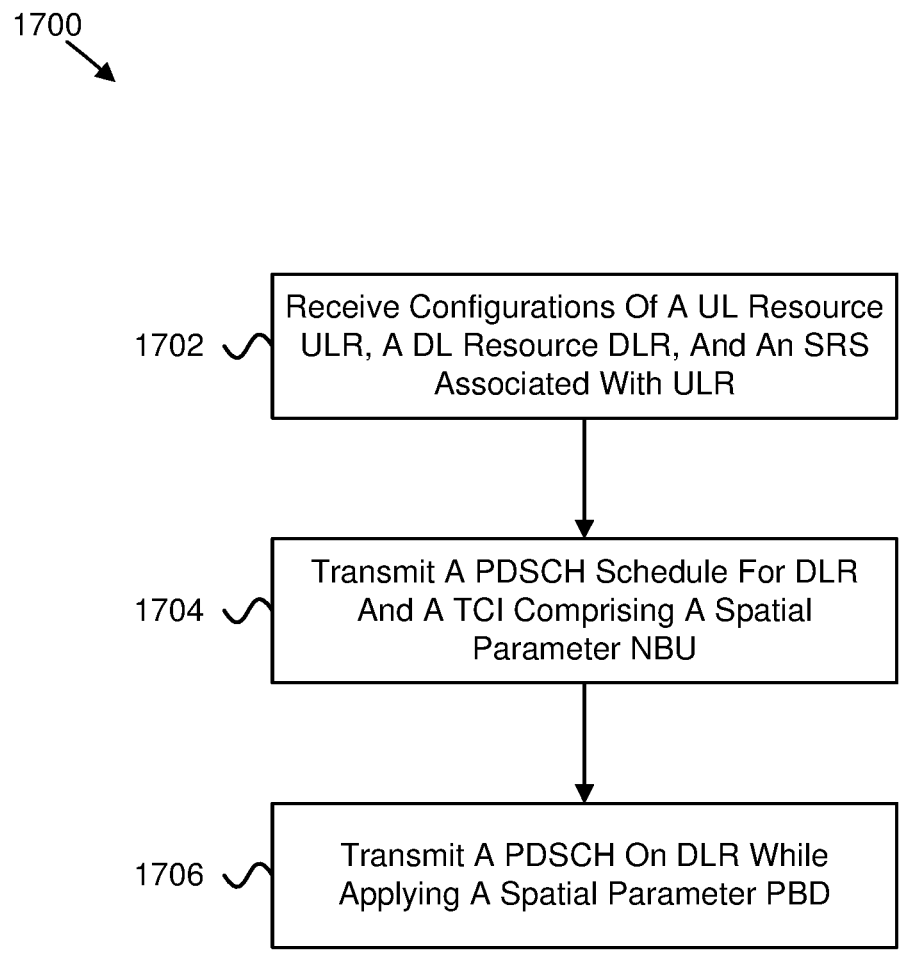
FIG. 17 is a flow chart diagram illustrating one embodiment of a method for P for Case B in which there may be CLI from C on N-MT.

FIG. 17 is a flow chart diagram illustrating one embodiment of a method 1700 for P for Case B in which there may be CLI from C on N-MT. The method 1700 includes receiving 1702 configurations of a UL resource ULR, a DL resource DLR, and an SRS associated with ULR. The method 1700 also includes transmitting 1704 a PDSCH schedule for DLR and a TCI comprising a spatial parameter NBU. Moreover, the method 1700 includes transmitting 1706 a PDSCH on DLR while applying a spatial parameter PBD.

Figure 18:
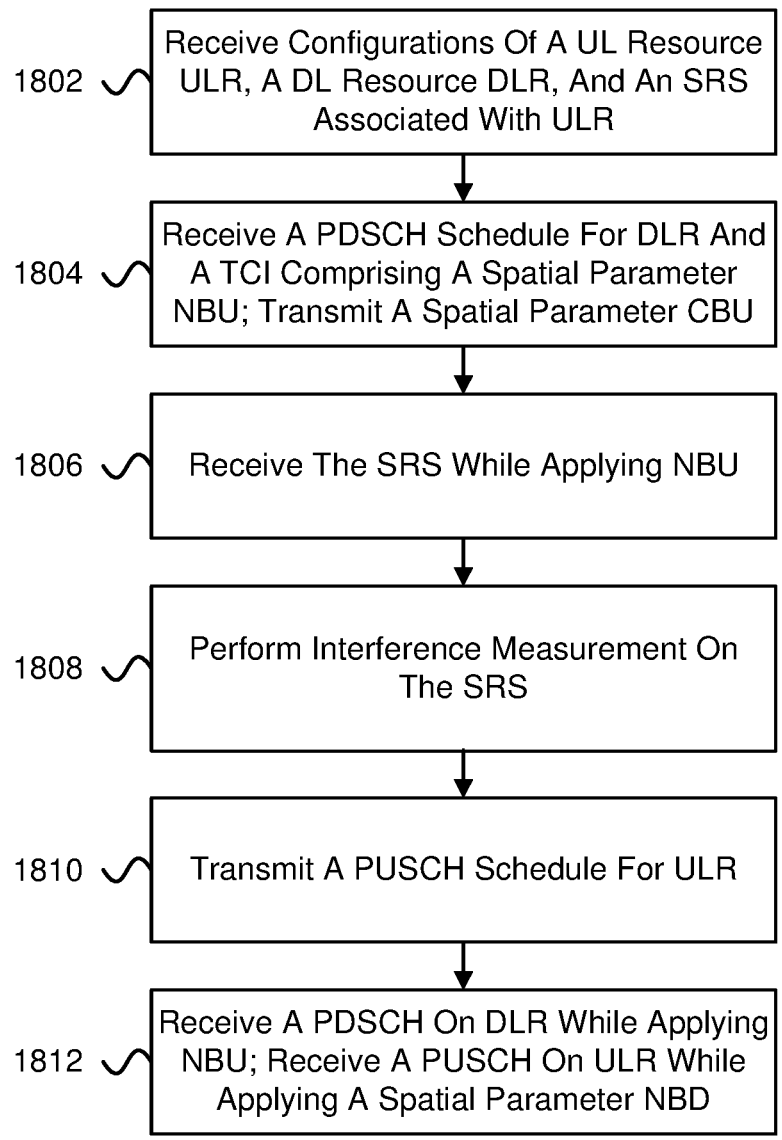
FIG. 18 is a flow chart diagram illustrating one embodiment of a method for N for Case B in which there may be CLI from C on N-MT.

FIG. 18 is a flow chart diagram illustrating one embodiment of a method 1800 for N for Case B in which there may be CLI from C on N-MT. The method 1800 includes receiving 1802 configurations of a UL resource ULR, a DL resource DLR, and an SRS associated with ULR. The method 1800 also includes receiving 1804 a PDSCH schedule for DLR and a TCI comprising a spatial parameter NBU and Transmit a spatial parameter CBU. The method 1800 includes receiving 1806 the SRS while applying NBU. The method 1800 also includes performing 1808 interference measurement on the SRS. The method 1800 includes transmitting 1810 a PUSCH schedule for ULR. The method 1800 also includes receiving 1812 a PDSCH on DLR while applying NBU and receiving a PUSCH on ULR while applying a spatial parameter NBD.

Figure 19:
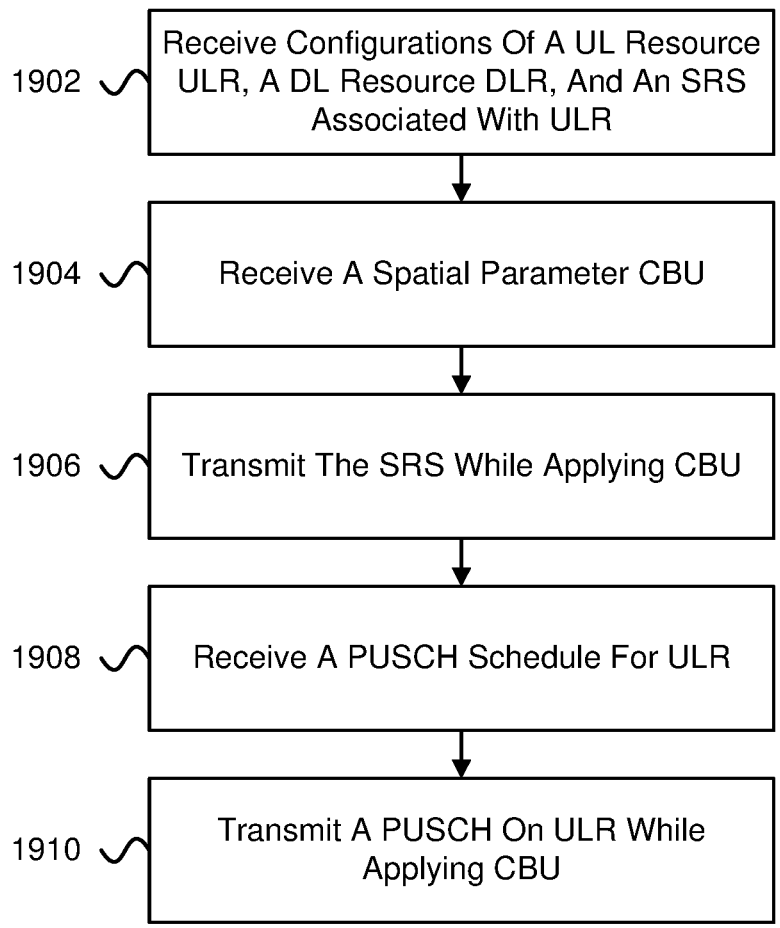
FIG. 19 is a flow chart diagram illustrating one embodiment of a method for C for Case B in which there may be CLI from C on N-MT.

FIG. 19 is a flow chart diagram illustrating one embodiment of a method 1900 for C for Case B in which there may be CLI from C on N-MT. The method 1900 includes receiving 1902 configurations of a UL resource ULR, a DL resource DLR, and an SRS associated with ULR. The method 1900 also includes receiving 1904 a spatial parameter CBU. The method 1900 includes transmitting 1906 the SRS while applying CBU. The method 1900 also includes receiving 1908 a PUSCH schedule for ULR. The method 1900 includes transmitting 1910 a PUSCH on ULR while applying CBU.

In FIGS. 17 through 19, PBD is a transmit beam; NBU is a receive beam; NBD is a receive beam; and CBU is a transmit beam.

For Case B there may be CLI from P on N-DU.

Figure 20:
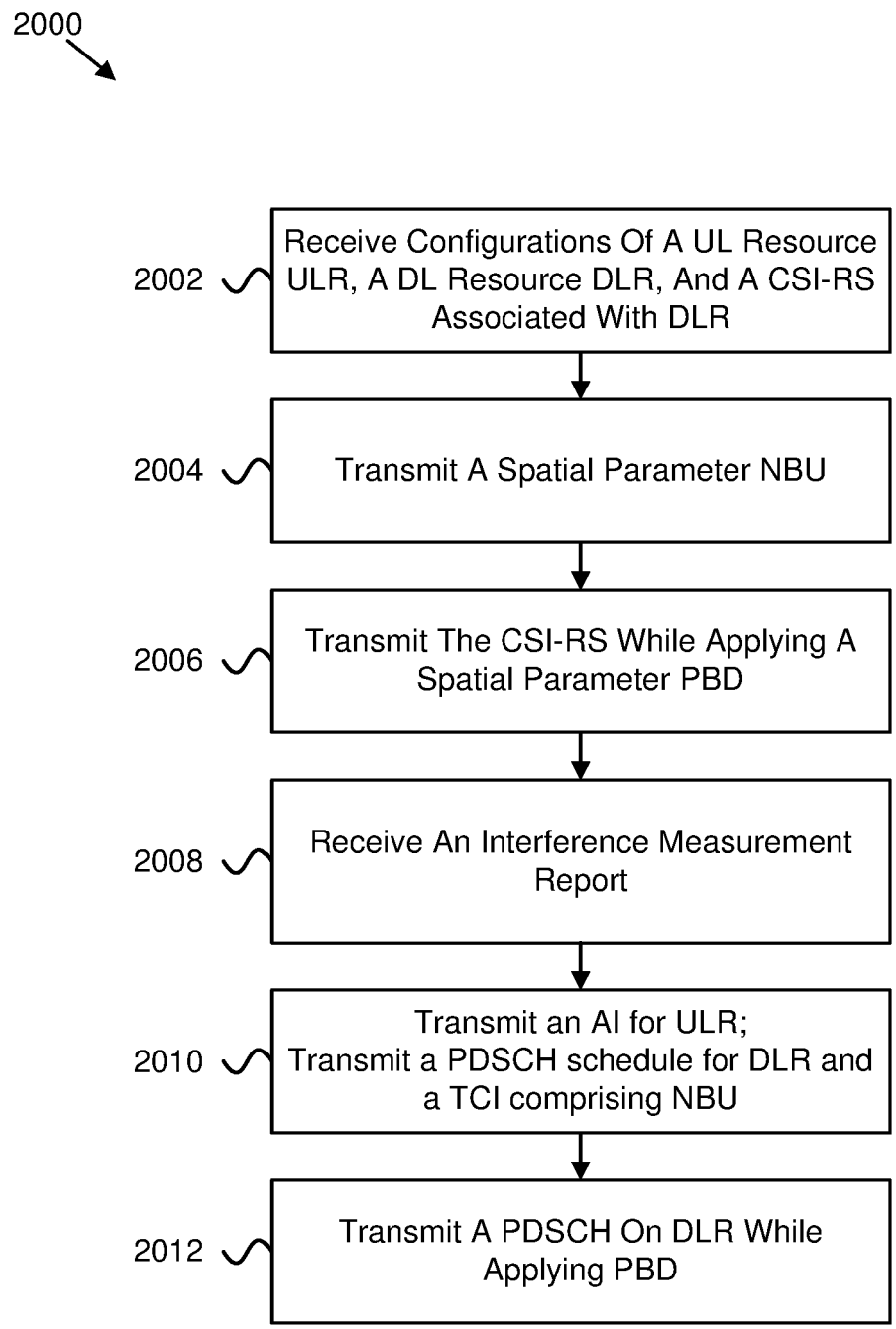
FIG. 20 is a flow chart diagram illustrating one embodiment of a method for P for Case B in which there may be CLI from P on N-DU.

FIG. 20 is a flow chart diagram illustrating one embodiment of a method 2000 for P for Case B in which there may be CLI from P on N-DU. The method 2000 includes receiving 2002 configurations of a UL resource ULR, a DL resource DLR, and a CSI-RS associated with DLR. The method 2000 also includes transmitting 2004 a spatial parameter NBU. The method 2000 includes transmitting 2006 the CSI-RS while applying a spatial parameter PBD. The method 2000 also includes receiving 2008 an interference measurement report. The method 2000 includes transmitting 2010 an AI for ULR and transmitting a PDSCH schedule for DLR and a TCI comprising NBU. The method 2000 also includes transmitting 2012 a PDSCH on DLR while applying PBD.

Figure 21:
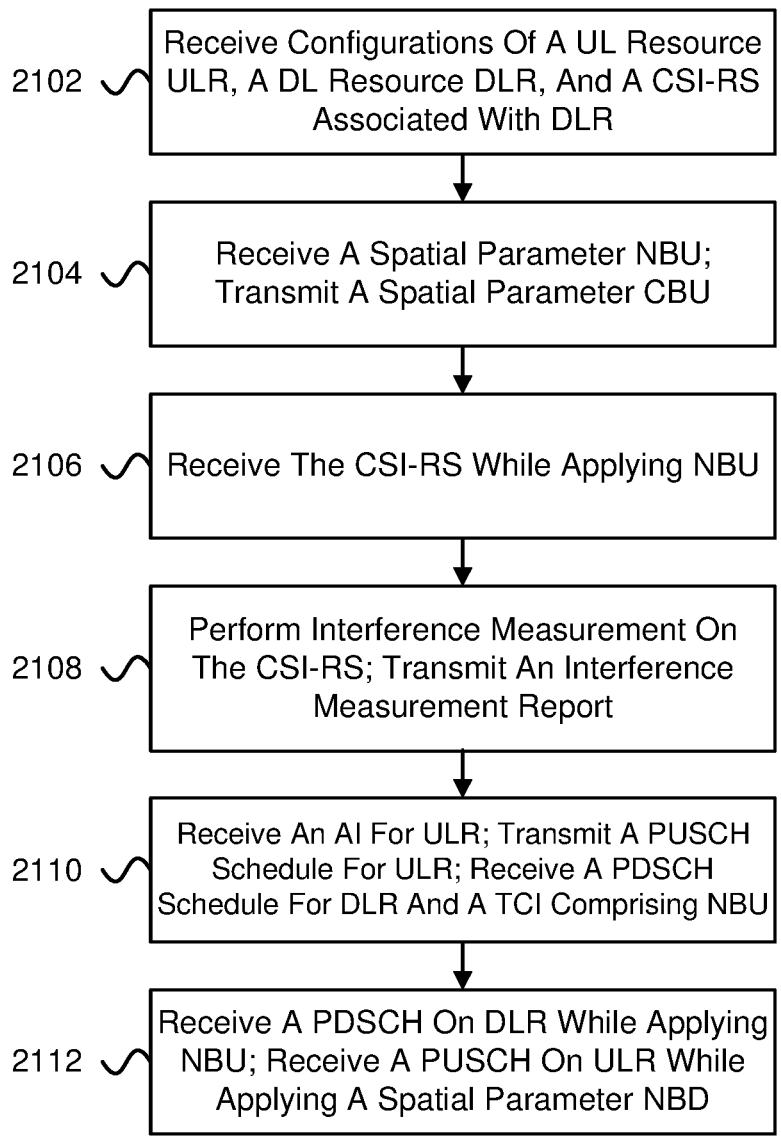
FIG. 21 is a flow chart diagram illustrating one embodiment of a method for N for Case B in which there may be CLI from P on N-DU.

FIG. 21 is a flow chart diagram illustrating one embodiment of a method 2100 for N for Case B in which there may be CLI from P on N-DU. The method 2100 includes receiving 2102 configurations of a UL resource ULR, a DL resource DLR, and a CSI-RS associated with DLR. The method 2100 also includes receiving 2104 a spatial parameter NBU and transmitting a spatial parameter CBU. The method 2100 includes receiving 2106 the CSI-RS while applying NBU. The method 2100 also includes performing 2108 interference measurement on the CSI-RS and transmitting an interference measurement report. The method 2100 includes receiving 2110 an AI for ULR, transmitting a PUSCH schedule for ULR, and receiving a PDSCH schedule for DLR and a TCI comprising NBU. The method 2100 also includes receiving 2112 a PDSCH on DLR while applying NBU and receiving a PUSCH on ULR while applying a spatial parameter NBD.

Figure 22:
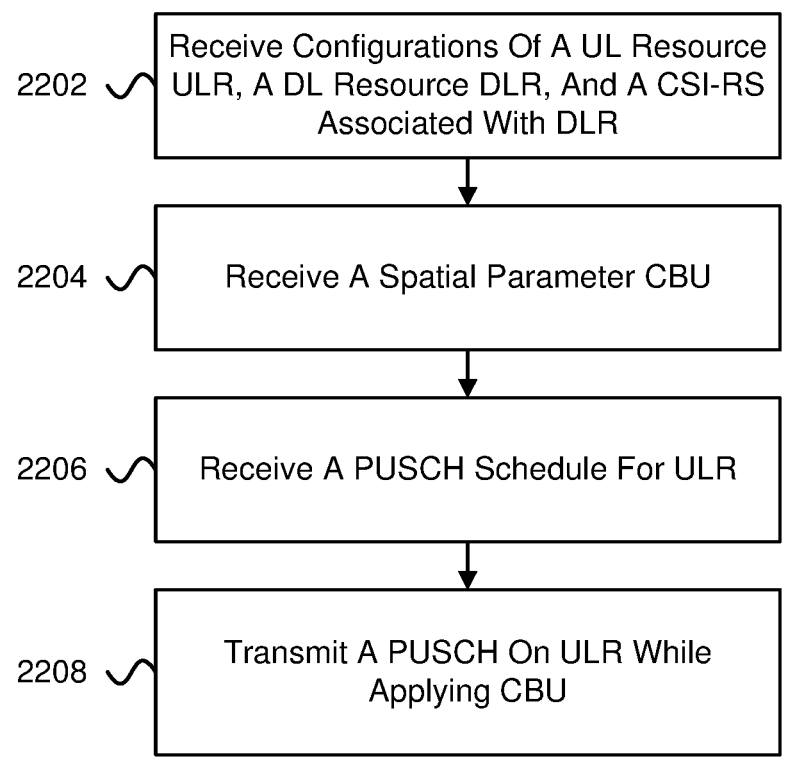
FIG. 22 is a flow chart diagram illustrating one embodiment of a method for C for Case B in which there may be CLI from P on N-DU.

FIG. 22 is a flow chart diagram illustrating one embodiment of a method 2200 for C for Case B in which there may be CLI from P on N-DU. The method 2200 includes receiving 2202 configurations of a UL resource ULR, a DL resource DLR, and a CSI-RS associated with DLR. The method 2200 also includes receiving 2204 a spatial parameter CBU. The method 2200 includes receiving 2206 a PUSCH schedule for ULR. The method 2200 also includes transmitting 2208 a PUSCH on ULR while applying CBU.

In FIGS. 20 through 22, PBD is a receive beam; NBU is a transmit beam; NBD is a transmit beam; and CBU is a receive beam.

For Case C there may be ICI from C on P.

Figure 23:
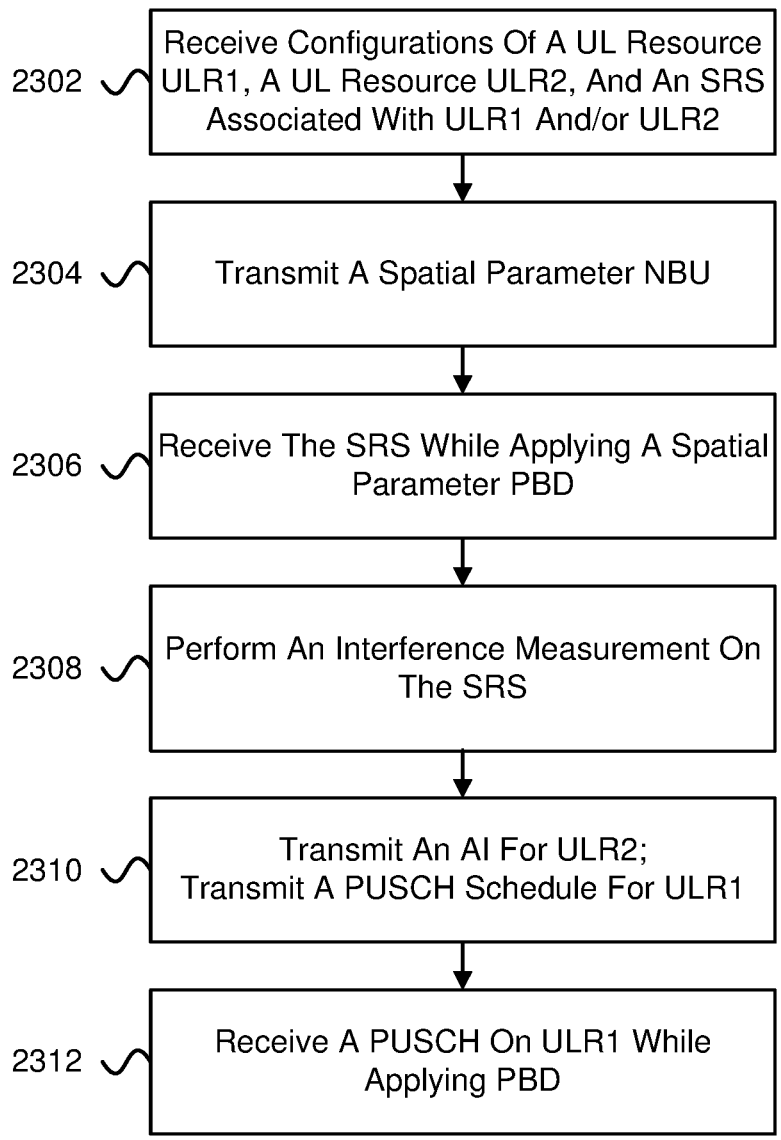
FIG. 23 is a flow chart diagram illustrating one embodiment of a method for P for Case C in which there may be ICI from C on P.

FIG. 23 is a flow chart diagram illustrating one embodiment of a method 2300 for P for Case C in which there may be ICI from C on P. The method 2300 includes receiving 2302 configurations of a UL resource ULR1, a UL resource ULR2, and an SRS associated with ULR1 and/or ULR2. The method 2300 also includes transmitting 2304 a spatial parameter NBU. The method 2300 includes receiving 2306 the SRS while applying a spatial parameter PBD. The method 2300 also includes performing 2308 an interference measurement on the SRS. The method 2300 includes transmitting 2310 an AI for ULR2 and transmitting a PUSCH schedule for ULR1. The method 2300 also includes receiving 2312 a PUSCH on ULR1 while applying PBD.

Figure 24:
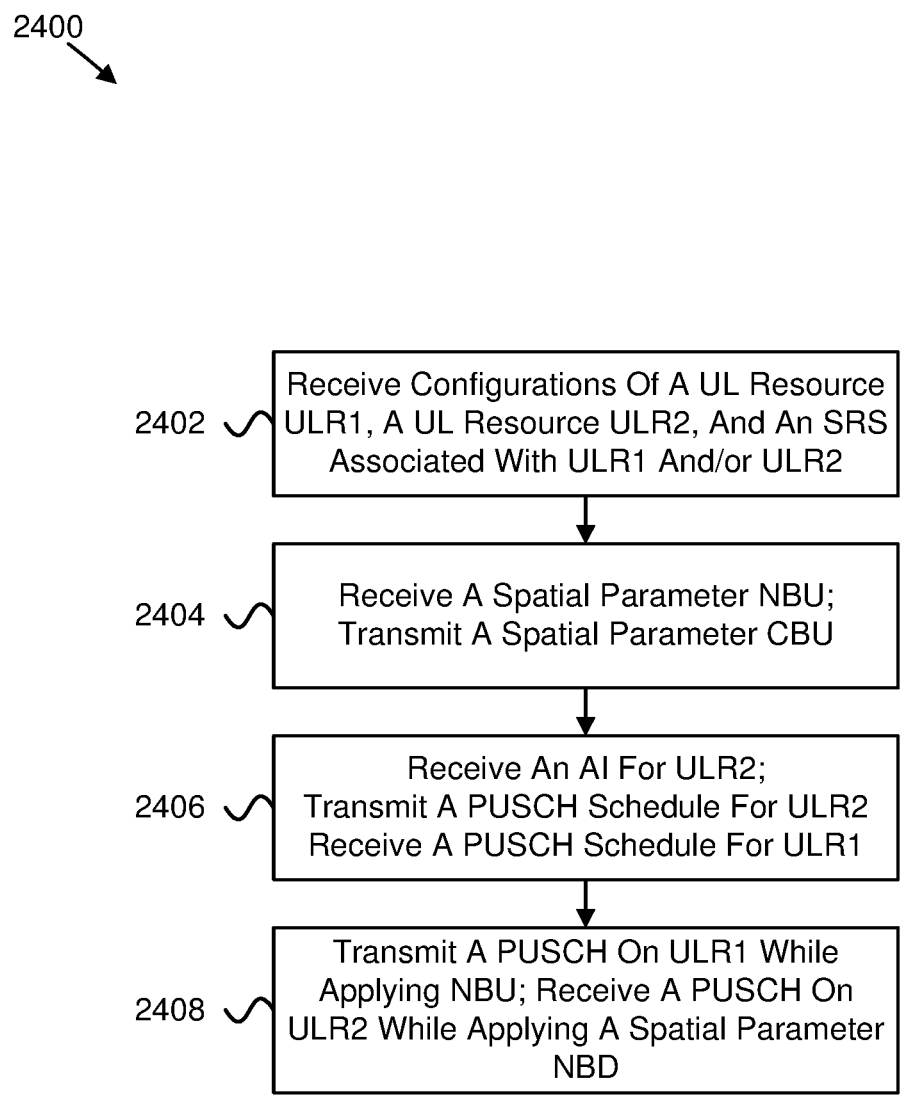
FIG. 24 is a flow chart diagram illustrating one embodiment of a method for N for Case C in which there may be ICI from C on P.

FIG. 24 is a flow chart diagram illustrating one embodiment of a method 2400 for N for Case C in which there may be ICI from C on P. The method 2400 includes receiving 2402 configurations of a UL resource ULR1, a UL resource ULR2, and an SRS associated with ULR1 and/or ULR2. The method 2400 also includes receiving 2404 a spatial parameter NBU and transmitting a spatial parameter CBU. The method 2400 includes receiving 2406 an AI for ULR2, transmitting a PUSCH schedule for ULR2, and receiving a PUSCH schedule for ULR1. The method 2400 also includes transmitting 2408 a PUSCH on ULR1 while applying NBU and receiving a PUSCH on ULR2 while applying a spatial parameter NBD.

Figure 25:
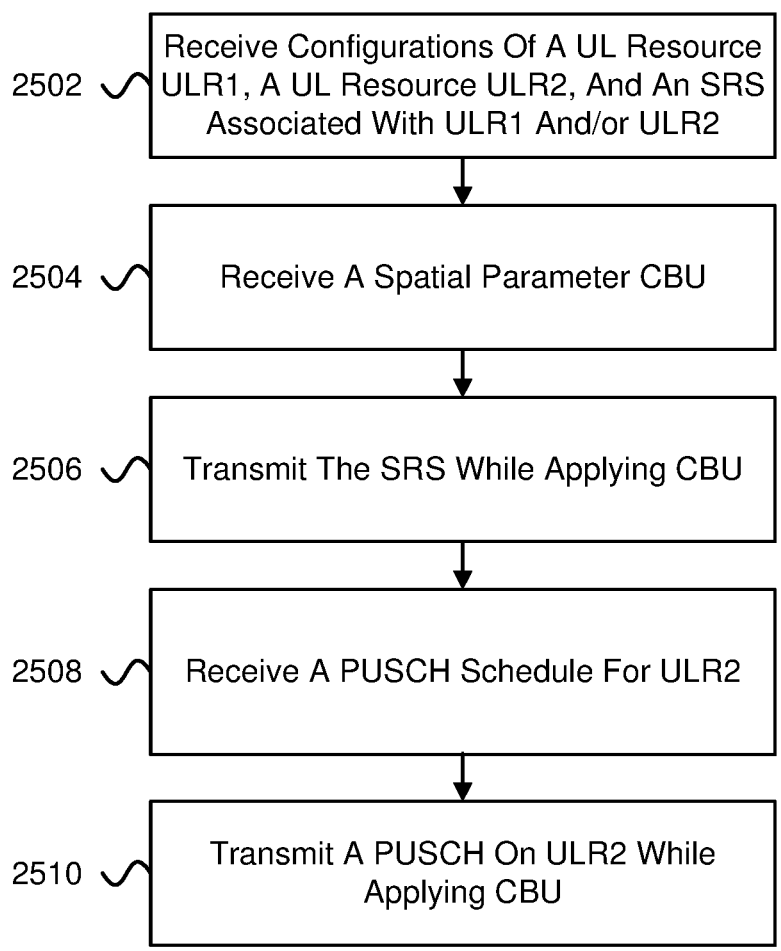
FIG. 25 is a flow chart diagram illustrating one embodiment of a method for C for Case C in which there may be ICI from C on P.

FIG. 25 is a flow chart diagram illustrating one embodiment of a method 2500 for C for Case C in which there may be ICI from C on P. The method 2500 includes receiving 2502 configurations of a UL resource ULR1, a UL resource ULR2, and an SRS associated with ULR1 and/or ULR2. The method 2500 also includes receiving 2504 a spatial parameter CBU. The method 2500 includes transmitting 2506 the SRS while applying CBU. The method 2500 also includes receiving 2508 a PUSCH schedule for ULR2. The method 2500 includes transmitting 2510 a PUSCH on ULR2 while applying CBU.

In FIGS. 23 through 25, PBD is a receive beam; NBU is a transmit beam; NBD is a receive beam; and CBU is a transmit beam.

For Case C there may be SI from N-MT on N-DU.

Figure 26:
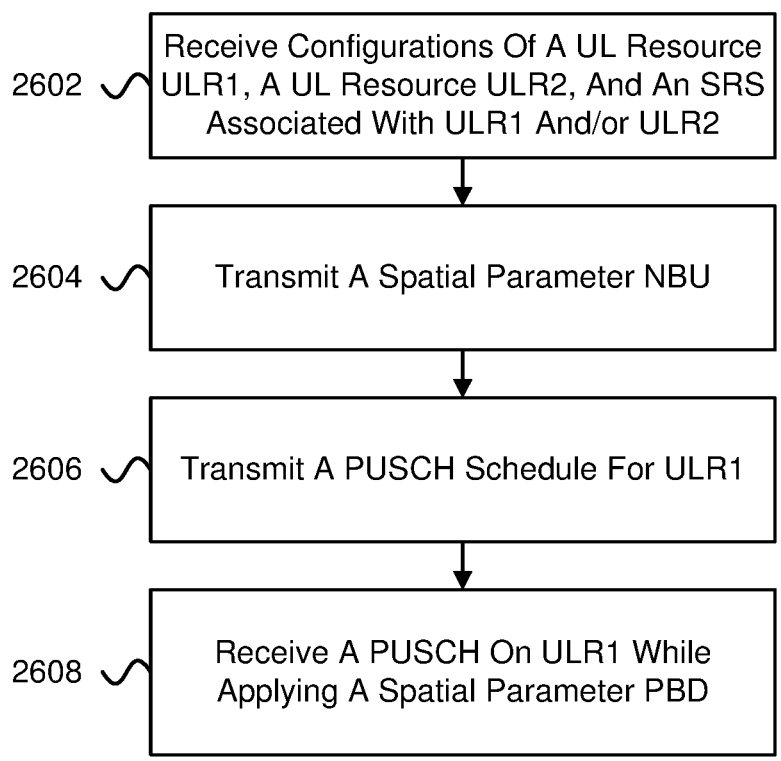
FIG. 26 is a flow chart diagram illustrating one embodiment of a method for P for Case C in which there may be SI from N-MT on N-DU.

FIG. 26 is a flow chart diagram illustrating one embodiment of a method 2600 for P for Case C in which there may be SI from N-MT on N-DU. The method 2600 includes receiving 2602 configurations of a UL resource ULR1, a UL resource ULR2, and an SRS associated with ULR1 and/or ULR2. The method 2600 also includes transmitting 2604 a spatial parameter NBU. The method 2600 includes transmitting 2606 a PUSCH schedule for ULR1. The method 2600 also includes receiving 2608 a PUSCH on ULR1 while applying a spatial parameter PBD.

Figure 27:
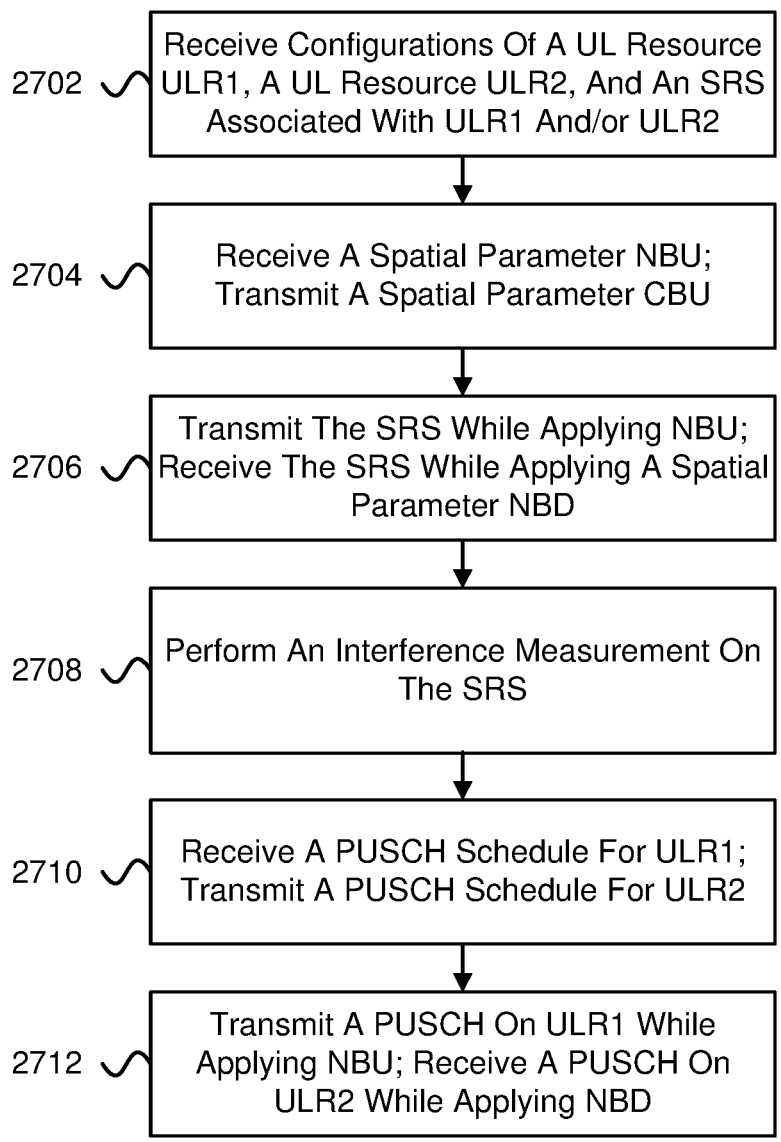
FIG. 27 is a flow chart diagram illustrating one embodiment of a method for N for Case C in which there may be SI from N-MT on N-DU.

FIG. 27 is a flow chart diagram illustrating one embodiment of a method 2700 for N for Case C in which there may be SI from N-MT on N-DU. The method 2700 includes receiving 2702 configurations of a UL resource ULR1, a UL resource ULR2, and an SRS associated with ULR1 and/or ULR2. The method 2700 also includes receiving 2704 a spatial parameter NBU and transmitting a spatial parameter CBU. The method 2700 includes transmitting 2706 the SRS while applying NBU and receiving the SRS while applying a spatial parameter NBD. The method 2700 also includes performing 2708 an interference measurement on the SRS. The method 2700 includes receiving 2710 a PUSCH schedule for ULR1 and transmitting a PUSCH schedule for ULR2. The method 2700 also includes transmitting 2712 a PUSCH on ULR1 while applying NBU and receiving a PUSCH on ULR2 while applying NBD.

Figure 28:
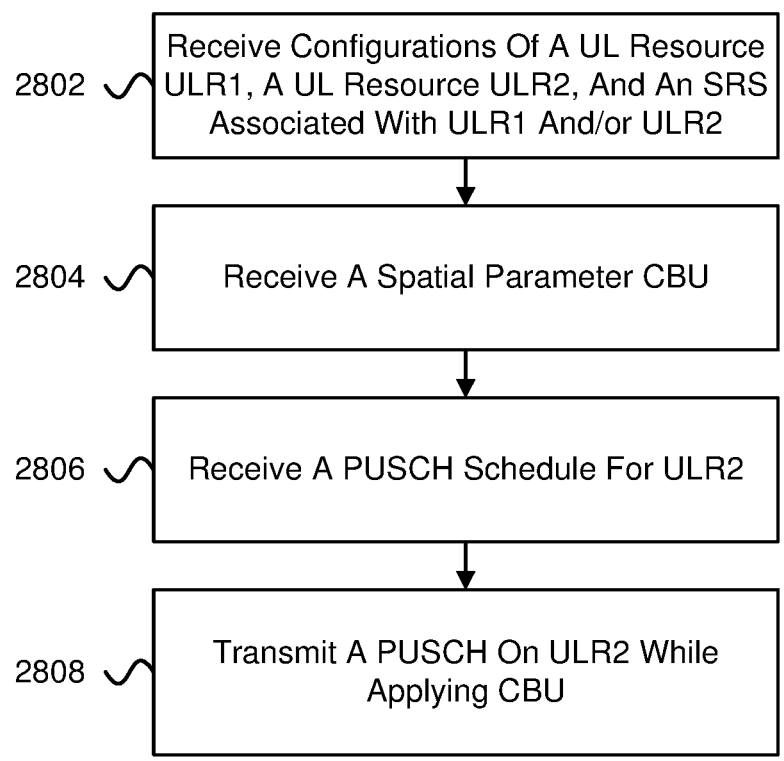
FIG. 28 is a flow chart diagram illustrating one embodiment of a method for C for Case C in which there may be SI from N-MT on N-DU.

FIG. 28 is a flow chart diagram illustrating one embodiment of a method 2800 for C for Case C in which there may be SI from N-MT on N-DU. The method 2800 includes receiving 2802 configurations of a UL resource ULR1, a UL resource ULR2, and an SRS associated with ULR1 and/or ULR2. The method 2800 also includes receiving 2804 a spatial parameter CBU. The method 2800 includes receiving 2806 a PUSCH schedule for ULR2. The method 2800 also includes transmitting 2808 a PUSCH on ULR2 while applying CBU.

In FIGS. 26 through 28, PBD is a receive beam; NBU is a transmit beam; NBD is a receive beam; and CBU is a transmit beam.

For Case D there may be ICI from P on C.

Figure 29:
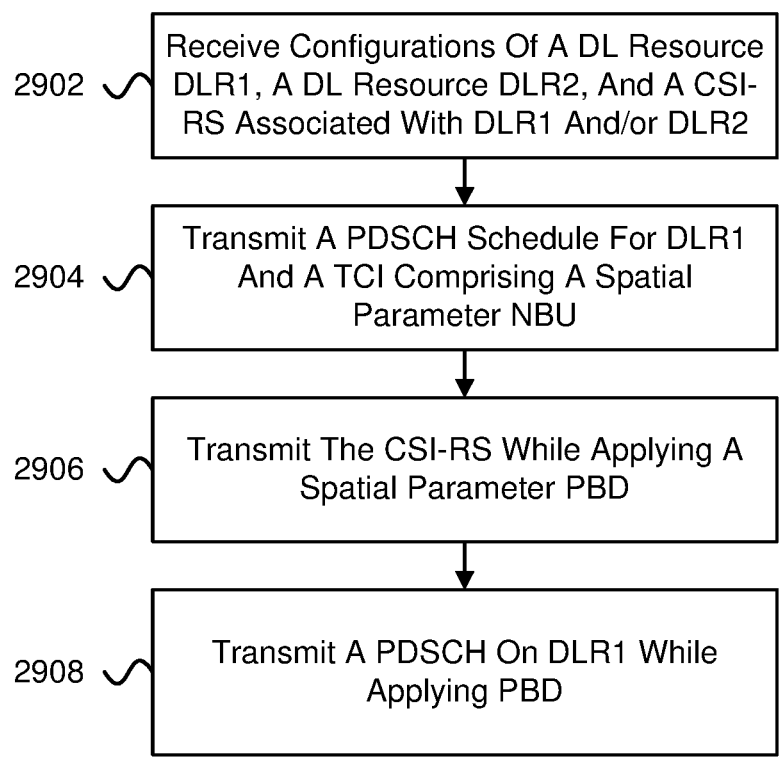
FIG. 29 is a flow chart diagram illustrating one embodiment of a method for P for Case D in which there may be ICI from P on C.

FIG. 29 is a flow chart diagram illustrating one embodiment of a method 2900 for P for Case D in which there may be ICI from P on C. The method 2900 includes receiving 2902 configurations of a DL resource DLR1, a DL resource DLR2, and a CSI-RS associated with DLR1 and/or DLR2. The method 2900 also includes transmitting 2904 a PDSCH schedule for DLR1 and a TCI comprising a spatial parameter NBU. The method 2900 includes transmitting 2906 the CSI-RS while applying a spatial parameter PBD. The method 2900 also includes transmitting 2908 a PDSCH on DLR1 while applying PBD.

Figure 30:
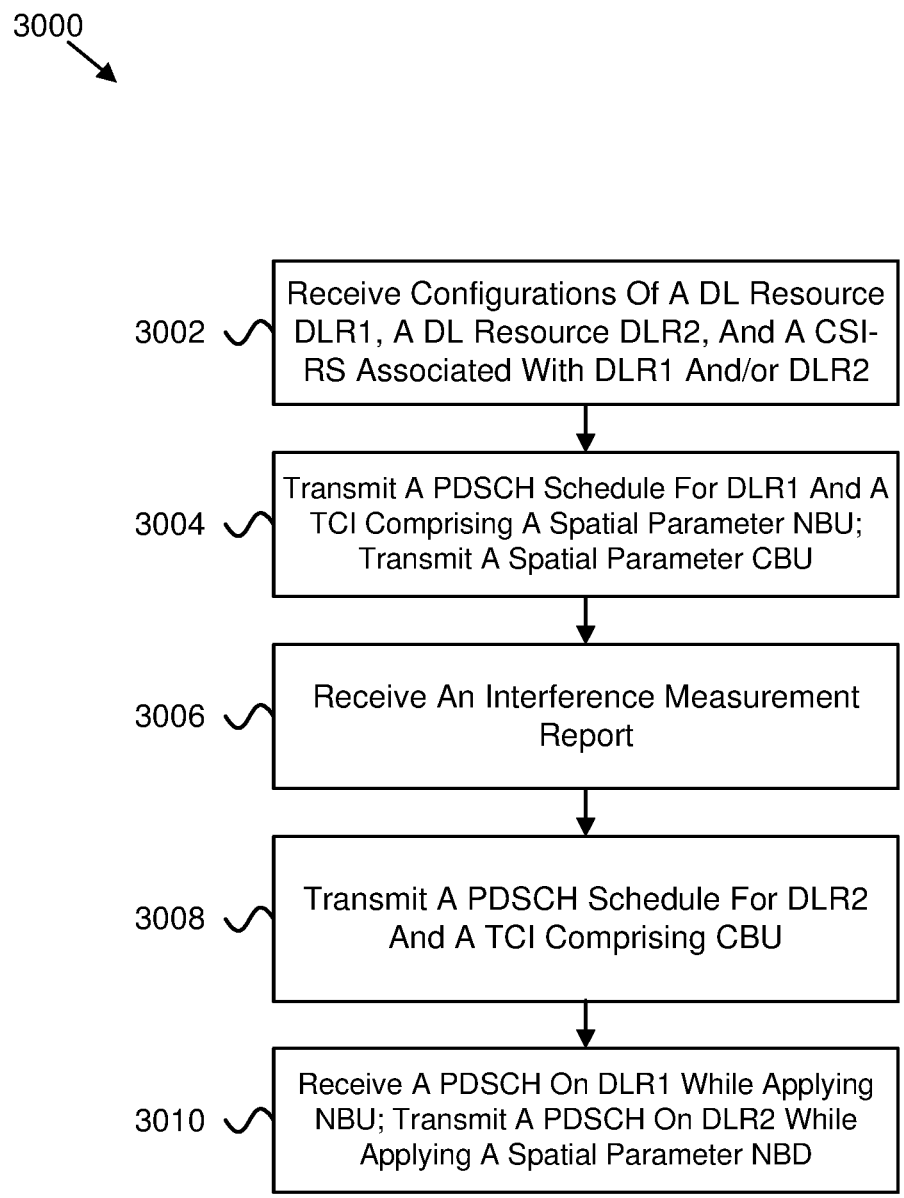
FIG. 30 is a flow chart diagram illustrating one embodiment of a method for N for Case D in which there may be ICI from P on C.

FIG. 30 is a flow chart diagram illustrating one embodiment of a method 3000 for N for Case D in which there may be ICI from P on C. The method 3000 includes receiving 3002 configurations of a DL resource DLR1, a DL resource DLR2, and a CSI-RS associated with DLR1 and/or DLR2. The method 3000 also includes transmitting 3004 a PDSCH schedule for DLR1 and a TCI comprising a spatial parameter NBU and transmitting a spatial parameter CBU. The method 3000 includes receiving 3006 an interference measurement report. The method 3000 also includes transmitting 3008 a PDSCH schedule for DLR2 and a TCI comprising CBU. The method 3000 includes receiving 3010 a PDSCH on DLR1 while applying NBU and transmitting a PDSCH on DLR2 while applying a spatial parameter NBD.

Figure 31:
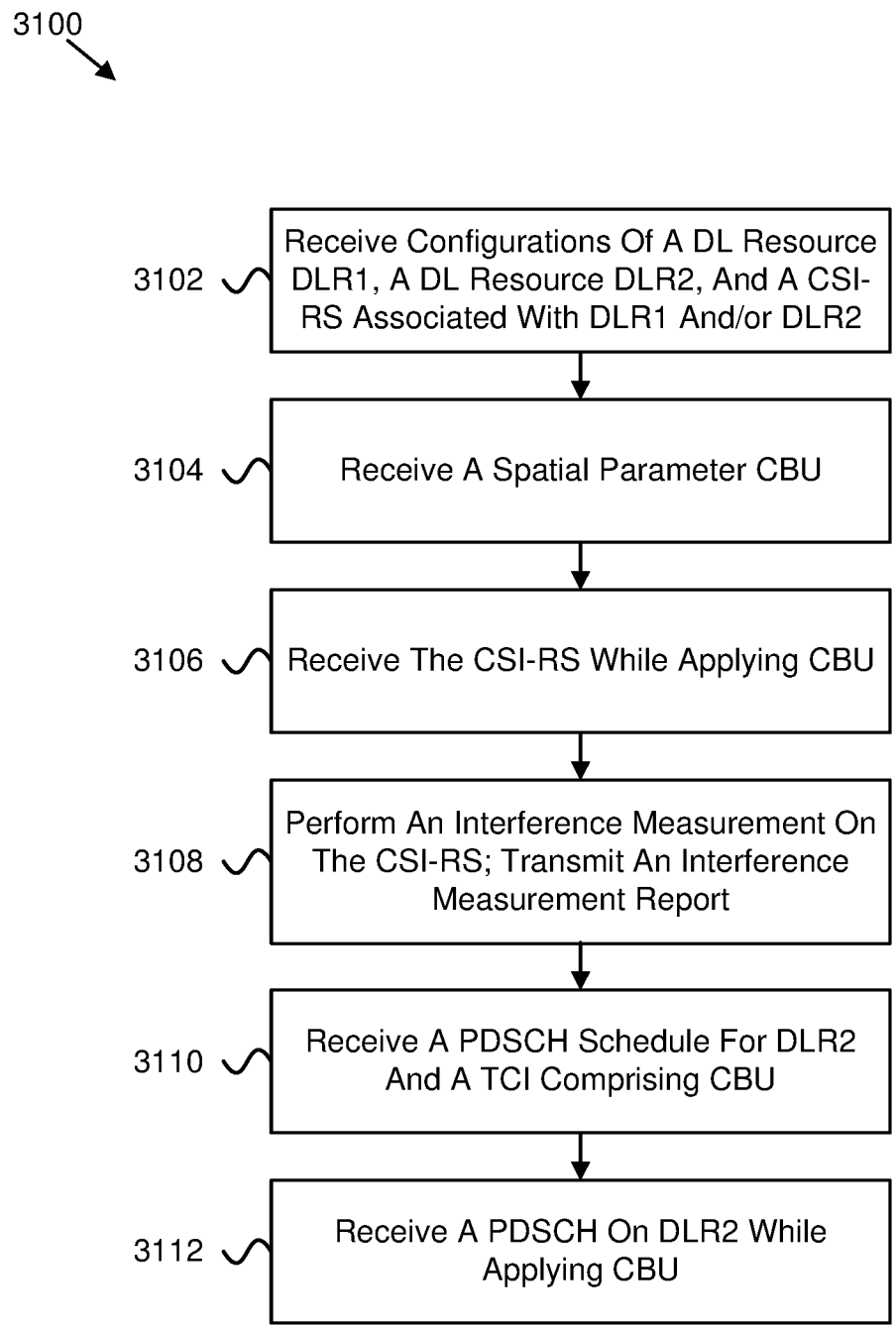
FIG. 31 is a flow chart diagram illustrating one embodiment of a method for C for Case D in which there may be ICI from P on C.

FIG. 31 is a flow chart diagram illustrating one embodiment of a method 3100 for C for Case D in which there may be ICI from P on C. The method 3100 includes receiving 3102 configurations of a DL resource DLR1, a DL resource DLR2, and a CSI-RS associated with DLR1 and/or DLR2. The method 3100 also includes receiving 3104 a spatial parameter CBU. The method 3100 includes receiving 3106 the CSI-RS while applying CBU. The method 3100 also includes performing 3108 an interference measurement on the CSI-RS and transmitting an interference measurement report. The method 3100 includes receiving 3110 a PDSCH schedule for DLR2 and a TCI comprising CBU. The method 3100 also includes receiving 3112 a PDSCH on DLR2 while applying CBU.

In FIGS. 29 through 31, PBD is a transmit beam; NBU is a receive beam; NBD is a transmit beam; and CBU is a receive beam.

For Case D there may be SI from N-DU on N-MT.

Figure 32:
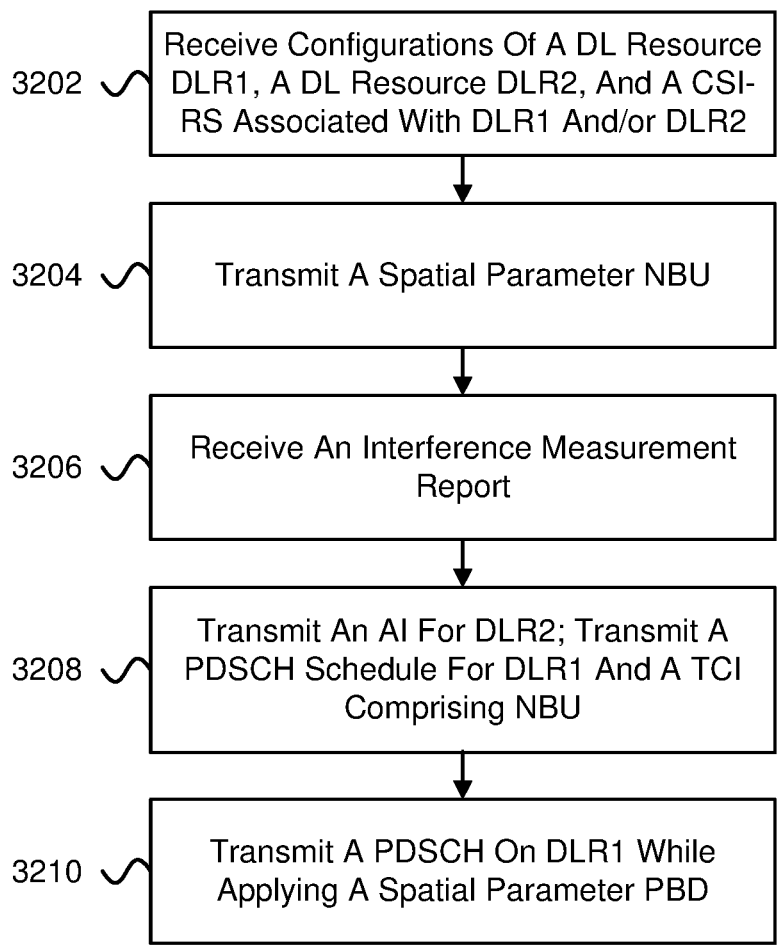
FIG. 32 is a flow chart diagram illustrating one embodiment of a method for P for Case D in which there may be SI from N-DU on N-MT.

FIG. 32 is a flow chart diagram illustrating one embodiment of a method 3200 for P for Case D in which there may be SI from N-DU on N-MT. The method 3200 includes receiving 3202 configurations of a DL resource DLR1, a DL resource DLR2, and a CSI-RS associated with DLR1 and/or DLR2. The method 3200 also includes transmitting 3204 a spatial parameter NBU. The method 3200 includes receiving 3206 an interference measurement report. The method 3200 also includes transmitting 3208 an AI for DLR2 and transmitting a PDSCH schedule for DLR1 and a TCI comprising NBU. The method 3200 includes transmitting 3210 a PDSCH on DLR1 while applying a spatial parameter PBD.

Figure 33:
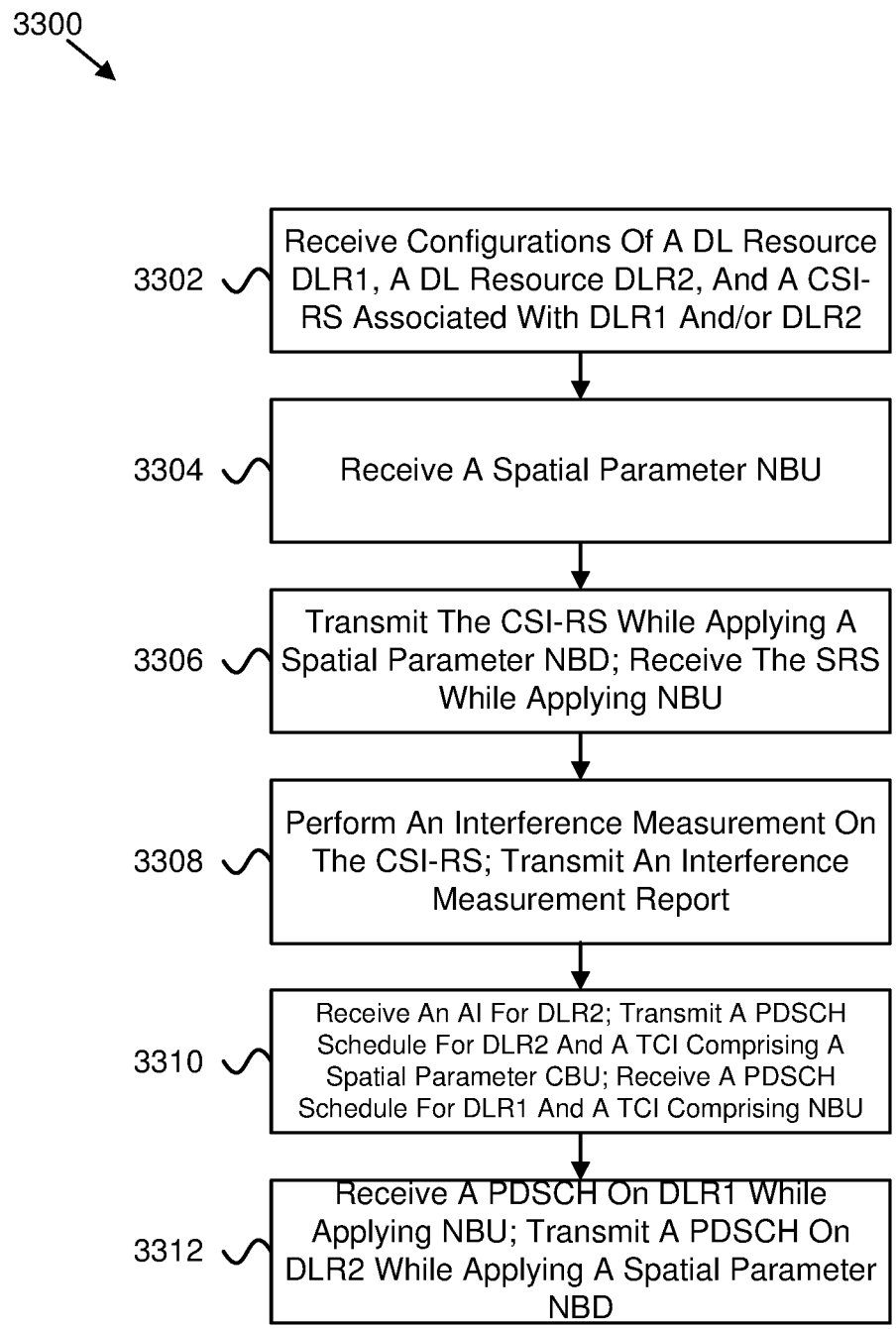
FIG. 33 is a flow chart diagram illustrating one embodiment of a method for N for Case D in which there may be SI from N-DU on N-MT.

FIG. 33 is a flow chart diagram illustrating one embodiment of a method 3300 for N for Case D in which there may be SI from N-DU on N-MT. The method 3300 includes receiving 3302 configurations of a DL resource DLR1, a DL resource DLR2, and a CSI-RS associated with DLR1 and/or DLR2. The method 3300 also includes receiving 3304 a spatial parameter NBU. The method 3300 includes transmitting 3306 the CSI-RS while applying a spatial parameter NBD and receive the SRS while applying NBU. The method 3300 also includes performing 3308 an interference measurement on the CSI-RS and transmitting an interference measurement report. The method 3300 includes receiving 3310 an AI for DLR2, transmitting a PDSCH schedule for DLR2 and a TCI comprising a spatial parameter CBU, and receiving a PDSCH schedule for DLR1 and a TCI comprising NBU. The method 3300 also includes receiving 3312 a PDSCH on DLR1 while applying NBU and transmitting a PDSCH on DLR2 while applying a spatial parameter NBD.

Figure 34:
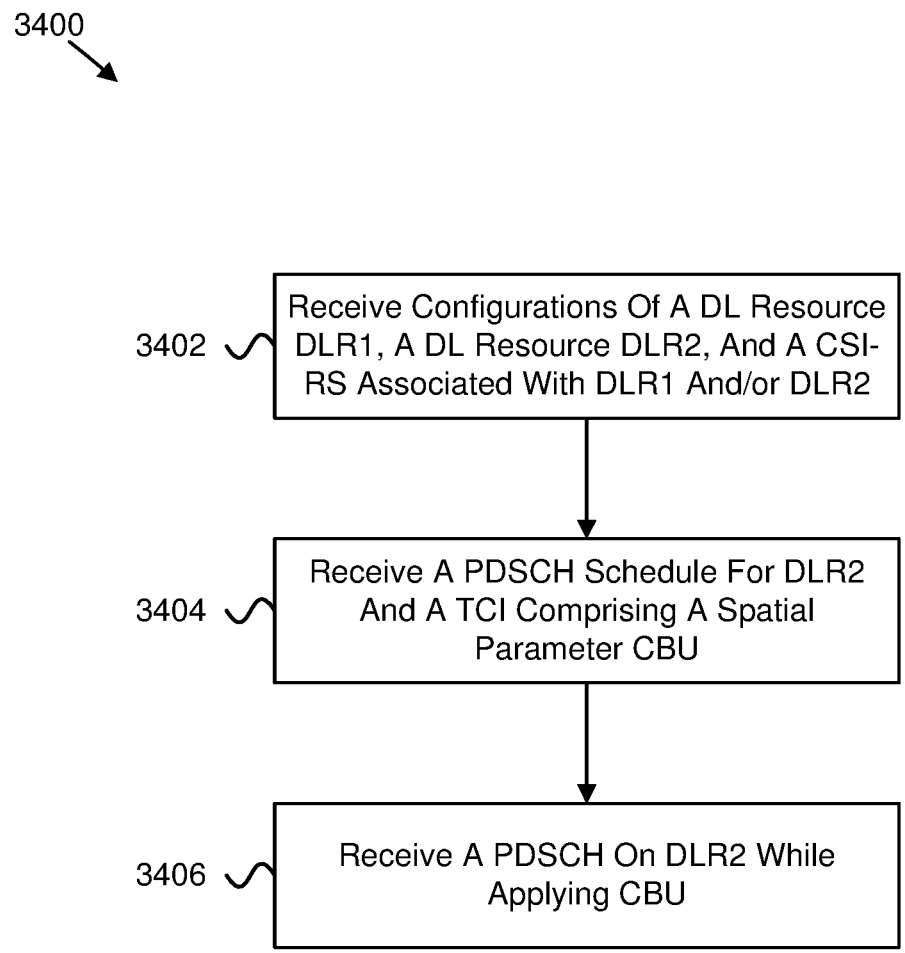
FIG. 34 is a flow chart diagram illustrating one embodiment of a method for C for Case D in which there may be SI from N-DU on N-MT.

FIG. 34 is a flow chart diagram illustrating one embodiment of a method 3400 for C for Case D in which there may be SI from N-DU on N-MT. The method 3400 includes receiving 3402 configurations of a DL resource DLR1, a DL resource DLR2, and a CSI-RS associated with DLR1 and/or DLR2. The method 3400 also includes receiving 3404 a PDSCH schedule for DLR2 and a TCI comprising a spatial parameter CBU. The method 3400 includes receiving 3406 a PDSCH on DLR2 while applying CBU.

In FIGS. 32 through 34, PBD is a transmit beam; NBU is a receive beam; NBD is a transmit beam; and CBU is a receive beam.

In certain embodiments, there may be further details on configurations and signaling steps.

It should be noted that configurations herein may be RRC configurations that an IAB node (or a UE) may receive from an IAB-CU. The configurations may include parameters for reference signals such as resources allocated for the reference signals, signaling to trigger transmission of a reference signal, beam and/or spatial relations and transmission power, and so forth.

In some embodiments, a reference signal for an interference evaluation may be any reference signal based on which an interference may be measured. For example, a channel state information reference signal ("CSI-RS") may be used for downlink (e.g., when interference by an IAB-DU is to be measured), while a sounding reference signal ("SRS") may be used for uplink (e.g., when interference by an IAB-MT or a UE is to be measured). Other types of reference signals may also be used. Once a reference signal is transmitted, it may be received by other nodes, (e.g., IAB nodes or UEs) to measure a reference signal receive power ("RSRP"), a reference signal reception quality ("RSRQ"), or the like.

In various embodiments, an alternative to a reference signal may be any other transmission based on which an interference or a received signal power such as a received signal strength indicator ("RSSI") may be computed.

In certain embodiments, the term interference measurement reference signals ("EIM-RS") refer to a reference signal that is used for interference evaluation. It should be noted that EIM-RS may be used as a generic term referring to a CSI-RS, an SRS, or any signal for an interference evaluation.

In some embodiments, such as in NR, a reference signal may be periodic, semi-persistent, or aperiodic. A periodic reference signal may be transmitted as long as an RRC configuration of the reference signal is valid. A semi-persistent reference signal may be configured by an RRC information element ("IE"), but its transmission may be controlled by MAC control element ("CE") signaling. An aperiodic reference signal may be configured by an RRC IE, but its transmission may be triggered by a physical layer and/or L1 signaling (e.g., a DCI message). For all of these reference signals, the RRC configuration includes parameters indicating which resources are allocated to a reference signal, while the additional MAC CE or DCI signaling may further activate and/or deactivate or trigger a transmission of the reference signal.

In various embodiments, an EIM-RS, which may be configured as a CSI-RS or an SRS, may not be allocated specific resources in time, frequency, and/or code domains. Instead, an EIM-RS may be allocated a pool of resources or may be configured without allocating any specific resources. In such embodiments, further signaling and/or a specification may determine which resources are to be used to transmit the EIM-RS.

In certain embodiments, a difference between a generic EIM-RS and legacy reference signals specified in NR may be a way that other parameters such as beam and/or spatial relations, transmission power, timing alignment, and other such parameters are determined for transmitting the EIM- RS. In some embodiments, an EIM-RS is associated with a channel or a set of resources.

In various embodiments, an EIM-RS is associated with a channel. If an IAB-DU has scheduled a downlink channel, such as a physical downlink shared channel ("PDSCH"), parameters for transmitting an EIM-RS associated with the PDSCH may be determined in accordance with the PDSCH. For example, a beam and/or spatial relation, a transmission power, and/or a timing alignment for transmitting the EIM-RS may be set equal to corresponding values for the PDSCH, or they may be set equal to corresponding values plus or minus an offset (e.g., a constant value). Similarly, if an IAB-MT has been scheduled on an uplink channel such as a physical uplink shared channel ("PUSCH"), parameters for transmitting an EIM-RS associated with the PUSCH may be determined in accordance with the PUSCH. For example, a beam and/or spatial relation, a transmission power, and/or a timing alignment for transmitting the EIM-RS may be set equal to corresponding values for the PUSCH, or they may be set equal to the corresponding values plus or minus an offset (e.g., a constant value).

In certain embodiments, an EIM-RS is associated with one or multiple resources, which is referred to as a set of resources herein. In such embodiments, parameters for transmitting an EIM-RS associated with a set of resources may be determined in accordance with the set of resources. For example, a beam and/or spatial relation, a transmission power, and/or a timing alignment for transmitting the EIM-RS may be set equal to corresponding values for the set of resources, or they may be set equal to the corresponding values plus or minus a constant offset. The set of resources may be a slot or a set of slots, a set of symbols, a sub-channel or a sub-band in a bandwidth part ("BWP"), a set of PRBs, or a combination thereof. Moreover, a set of resources may be determined in time, frequency, and/or code domains.

In some embodiments, an association may be with a subset of a set of resources (e.g., hard resources, soft resources, downlink resources, uplink resources, or the like) in the set of resources. An association may be determined by a configuration and/or a control signaling. Specifically, a downlink transmission of an EIM-RS, such as a CSI-RS, may be associated with downlink resources, or downlink and flexible resources in a set of resources. Similarly, an uplink transmission of an EIM-RS, such as an SRS, may be associated with uplink resources, or uplink and flexible resources in a set of resources. In either case, parameters for transmitting the EIM-RS associated with a subset of the set of resources may be determined in accordance with the subset of set of resources. In various embodiments, an association may be made with a subset of the set of resources that are hard, soft, hard or soft, soft and indicated available by control signaling, or the like. In certain embodiments, a subset may be determined jointly by a downlink, uplink, and/or flexible type, and a hard, soft, and/or available type.

In some embodiments, association between an EIM-RS and a channel or a set of resources may be determined by a configuration. In various embodiments, an association may be determined by signaling such as MAC CE or L1 and/or DCI signaling. The configurations and control signaling described may come before the communication steps illustrated in FIG. 6 through 8.

In certain embodiments, an EIM-RS may be associated with a channel, a set of resources, a subset of a set of resources, or the like. The association may determine values for parameters such as a beam and/or spatial information, a transmission power, a timing alignment, and the like for the EIM-RS based on corresponding values for the channel or the set and/or subset of resources.

In FIGS. 7 and 8, a first channel is scheduled by a DCI message. In some embodiments, an IAB node (e.g., parent IAB-DU) or a gNB may transmit the DCI scheduling a channel for communication with another integrated access and backhaul ("TAB") node (e.g., child IAB-MT) or a UE. The channel may be a shared channel such as a PDSCH or a PUSCH.

In various embodiments, communications and/or channels scheduled for the communications may be prioritized. In such embodiments, a channel and/or communication with a higher priority may be scheduled at an early stage such as the DCI scheduling a first channel in FIGS. 7 and 8. Then, if an interference evaluation shows that another channel and/or communication can be scheduled simultaneously (e.g., separated in frequency or spatial domains sufficiently), the channel and/or communication may be scheduled at a later stage such as the DCI scheduling the second channel in FIGS. 7 and 8.

In certain embodiments, to perform interference evaluations, IAB nodes and/or UEs may transmit reference signals (e.g., referred to as EIM-RS herein) as configured by an IAB-CU and/or indicated by control signaling such as a MAC CE message or an L1 and/or DCI message. If an EIM-RS is associated with a scheduled channel, parameters such as a beam and/or spatial relation, a transmission power, a timing alignment, and the like may be determined based on corresponding parameters for the scheduled channel. In some embodiments, if an EIM-RS is associated with a set and/or subset of resources, parameters such as a beam and/or spatial relation, a transmission power, a timing alignment, and the like may be determined based on corresponding parameters for the set and/or subset of resources.

In various embodiments, an EIM-RS may not be allocated resources by configuration. One possible reason may be that nodes may transmit EIM-RS in accordance with a channel and, therefore, if a node has not scheduled a corresponding channel, it may refrain from transmitting an EIM-RS and any resources allocated to the EIM-RS may be wasted. Another reason may be that a frequency-domain resource and/or a spatial-domain parameter (e.g., such as a beam-forming parameter) for transmitting the EIM-RS may be determined in accordance with a channel or a set/subset of resources, in which case resources and/or parameters for transmitting an EIM-RS may vary from an instance in a slot to another instance in another slot.

In certain embodiments, an EIM-RS is configured with resources similar to a reference signal configuration in a legacy system. In such embodiments, it may be expected that resources allocated to EIM-RS from different nodes in a vicinity do not overlap or collide. This condition may be easier to satisfy in fixed IAB systems compared to mobile IAB systems (e.g., IAB systems in which some IAB nodes may be mobile). Accordingly, an IAB-CU may decide whether to allocate fixed or variable resources to an EIM-RS based on a signaling that determines whether a corresponding IAB node and/or system is fixed or mobile, respectively.

In some embodiments, resources and/or other parameters for transmitting an EIM-RS may be determined in accordance with a parameter such as a node identifier ("ID"), a cell ID, a channel ID, a priority parameter, a random (or pseudo random) parameter, or a combination thereof. A purpose of such a resource allocation method may be to avoid an overlap and/or collision between resources allocated to different EIM-RS, or at least reduce the probability of an overlap and/or collision between resources allocated to different EIM-RS.

In various embodiments, a time resource for transmitting an EIM-RS (e.g., a symbol or a slot) may be determined in accordance with a node ID, a cell ID, a bandwidth part ("BWP") ID, a channel ID, a priority parameter such as a quality-of-service ("QoS") parameter, or the like. In certain embodiments, a symbol or a slot for an EIM-RS transmission may be determined based on a least significant bit or a most significant bit of a node ID, a cell ID, a BWP ID, a channel ID, a priority parameter such as a QoS parameter, or the like. The node ID may be associated with the node transmitting or receiving the EIM-RS. The cell ID may be associated with the cell in which the EIM-RS is transmitted. In some embodiments, a symbol or a slot for transmitting an EIM-RS is determined based on an AI for a soft resource such as a soft time resource.

In certain embodiments, a frequency resource for transmitting an EIM-RS, for example a BWP, a set of physical resource blocks ("PRBs"), a sub-channel, or the like, may be determined in accordance with a node ID, a cell ID, a BWP ID, a channel ID, or the like. In some embodiments, a BWP for transmitting an EIM-RS may be set to a BWP associated with either a BWP ID or a channel ID. In various embodiments, a set of PRBs for transmitting an EIM-RS is set to a set of PRBs for transmitting a channel determined by a channel ID. In certain embodiments, a set of PRBs or a sub-channel for transmitting an EIM-RS is determined based on an AI for a soft resource such as a soft frequency resource. For example, the set of PRBs may be set to the PRBs indicated available by a control signaling. In this example, the control signaling for a frequency-domain availability indication ("FD-AI") may be associated with resources on which the EIM-RS is transmitted, the resources on which the associated channel is scheduled, or the associated set and/or subset of resources.

In some embodiments, a beam and/or spatial parameter for transmitting an EIM-RS may be determined in accordance with a node ID, a cell ID, BWP ID, a channel ID, or the like. In various embodiments, a beam and/or spatial parameter is set to the beam and/or spatial parameter associated with a channel determined by the channel ID. In this case, if the spatial parameter for a communication on the channel is indicated by a spatial parameter field in a control message such as a TCI state, a spatial parameter for transmitting the EIM-RS may be set to the indicated spatial parameter field in the control message. Similarly, if a spatial parameter is indicated by a semi-static signaling or other explicit or implicit means, a spatial parameter for transmitting the EIM-RS may be set to the indicated spatial parameter.

In various embodiments, a transmission power for transmitting an EIM-RS may be determined in accordance with a reference signal resource ID, a node ID, a cell ID, a BWP ID, a channel ID, or the like. In certain embodiments, a transmission power for transmitting the EIM-RS may be set to an transmission power associated with a beam and/or spatial parameter, a cell, a BWP, or a channel associated with the reference signal resource ID, the cell ID, the BWP ID, or the channel ID, respectively, as indicated by a control signaling and/or a semi-static configuration.

In certain embodiments, a timing alignment parameter for transmitting an EIM-RS may be determined in accordance with a reference signal resource ID, a node ID, a cell ID, a BWP ID, a channel ID, or the like. In some embodiments, a timing alignment parameter for transmitting the EIM-RS may be set to a timing alignment parameter associated with a beam and/or spatial parameter, a cell, a BWP, or a channel associated with the reference signal resource ID, the cell ID, the BWP ID, or the channel ID, respectively, as indicated by a control signaling and/or a semi-static configuration. In various embodiments, a timing alignment parameter for transmitting the EIM-RS may be set to a timing alignment parameter associated with a set of resources as indicated by a control signaling and/or a semi-static configuration. In certain embodiments, a timing alignment method may be determined based on the simultaneous operation case. For example, a transmission timing alignment may be used for Case A or a reception timing alignment may be used for Case B.

In some embodiments, a parameter for transmitting an EIM-RS may be set to a corresponding parameter plus an offset (e.g., such as a constant value).

In various embodiments, a node has scheduled (or has been scheduled) to transmit a signal in a channel (e.g., a first channel in FIGS. 7 and 8) on time resources T and frequency resources F, by an antenna and/or panel A, through a beam and/or spatial relation B, with a transmission power P, and/or with a timing alignment t. Then, the node may apply the values of A, B, P, and/or t for transmitting the EIM-RS on resources associated with T and F. A and/or B may be determined by a spatial relation information parameter or a QCL Type D parameter (e.g., a TCI state in a DCI message scheduling the channel). P may be determined by semi-static and/or dynamic power control mechanisms. t may be determined by semi-static and/or dynamic timing alignment mechanisms. Applying each of the values may include applying an additional positive or negative offset as determined by the standard, a configuration, and/or a control signaling.

In certain embodiments, a node may transmit a signal on time resources T and frequency resources F (or a subset of T and F), by an antenna and/or panel A, through a beam and/or spatial relation B, with a transmission power P, and/or with a timing alignment t. Then, the node may apply the values of A, B, P, and/or t for transmitting the EIM-RS on resources associated with T and F (or the subset of T and F). A and/or B may be determined by a spatial relation information parameter or a QCL Type D parameter (e.g., a semi-static TCI state for T and F (or the subset of T and F)). P may be determined by semi-static and/or dynamic power control mechanisms. t may be determined by semi-static and/or dynamic timing alignment mechanisms. Applying each of the values may include applying an additional positive or negative offset as determined by the standard, a configuration, and/or a control signaling.

In some embodiments, if a node transmits EIM-RS on multiple symbols with 'repetition' set to 'on', the node transmits EIM-RS that are quasi-collocated ("QCL'ed") with respect to receive spatial parameters (e.g., QCL Type D).

In various embodiments, a configuration of EIM-RS may indicate a resource pool from which resources may be selected randomly and used for an EIM-RS transmission. In this embodiment, multiple EIM-RS associated with multiple nodes may share the same resources, hence resulting in a nonzero probability of overlap or collision between resources of multiple EIM-RS.

In certain embodiments, nodes (e.g., IAB nodes and/or UEs) transmit EIM-RS in accordance with associated scheduled channels and/or resource sets and/or subsets. At the same time, nodes may listen to the wireless medium to receive the EIM-RS and perform interference measurements.

In some embodiments, a node (e.g., IAB node or UE) may listen to EIM-RS time resources T and frequency resources F, by an antenna and/or panel A, through a beam and/or spatial relation B, and/or a timing alignment tin accordance with a scheduled signal reception or a potential signal reception.

In various embodiments, a node that is scheduled to receive signals on a channel (e.g., a first channel in FIGS. 7 and 8) may listen to EIM-RS resources associated with the channel to perform an interference measurement. The node may be a child IAB-MT or a UE for a downlink channel, or a parent IAB-DU or a gNB for an uplink channel.

In certain embodiments, a node that is configured as a receiving side of communications on a set of resources or a subset of a set of resources may listen to EIM-RS resources associated with the set and/or subset of resources to perform an interference measurement. For a node to be considered as a receiving side of a resource, the node may be a child IAB-MT or a UE if the resource is downlink (or flexible), or a parent IAB-DU or a gNB if the resource is uplink (or flexible). In some embodiments, a resource may be considered based on whether it is a hard resource, a soft resource, or a soft resource that is indicated available by an AI message. Moreover, a node may receive an EIM-RS and perform measurements on it if the EIM-RS is associated with a resource for which the node is configured as a receiving side and the resource is hard, soft, and/or soft and indicated available.

In various embodiments, a node intends to perform measurements through multiple beams and/or spatial relations on an antenna and/or panel, the node may listen to multiple symbols associated with EIM-RS transmissions with 'repetition' set to 'on' (e.g., EIM-RS that are QCL'ed with respect to receive spatial parameters (Type D)).

In certain embodiments, a measurement may be performed on resources that are not necessarily configured for receiving a reference signal for a node. In such embodiments, the node may measure a receive signal power and obtain a RSSI or the like.

In some embodiments, with regard to interference measurement, a source and intensity of an interference may be different based on a duplexing and/or multiplexing case, hardware, number of antenna panels, and so forth. In the case of FDM, a signal on a first frequency may cause an interference on a signal on a second frequency due to existence of sidelobes. This type of interference may be more severe if a node uses one antenna panel for multiple simultaneous operations.

In various embodiments, for spatial domain multiplexing ("SDM"), a signal via a first beam and/or spatial setting may cause an interference on a signal via a second beam and/or spatial setting even if the corresponding operations are performed via multiple antenna panels. The cause of this type of interference may be lack of spatial separation between two beams and/or spatial settings, possibly further exacerbated by external objects and/or reflectors appearing or disappearing, mobility of the node, and so forth.

In certain embodiments, due to the diverse types and causes of interference, an IAB-CU may configure one of the embodiments herein based on information such as an IAB node capability, a number of panels, a type of simultaneous operation (e.g., which may itself be determined by resource configurations and resource multiplexing), an IAB node mobility, a history of success or failure associated with a type of duplexing and/or multiplexing, or the like.

In some embodiments, a parent node or another local node may signal to execute one of the embodiments described herein based on information such as an IAB node capability, a number of panels, a type of simultaneous operation (which may itself be determined by resource configurations and resource multiplexing), an IAB node mobility, a history of success or failure associated with a type of duplexing and/or multiplexing, or the like.

In various embodiments, once a node transmits or receives EIM-RS, it may take an action described herein. The action may be determined by a standard specification and/or a configuration. In the embodiments of FIGS. 6 thorough 8, such an action may be taken at the control signaling stage.

In certain embodiments, an action may include to transmit or receive a measurement report. If a node receives an EIM-RS, the node may perform a measurement and transmit a report as configured. The report may then be used to take further action. In some embodiments, a node transmitting a measurement report may be a child IAB node or a UE. A node receiving the measurement report may be a parent IAB node or a gNB. In such embodiments, the parent IAB node or the gNB may or may not be a transmitter of the EIM-RS received by the child IAB node or the UE.

In various embodiments, an action may include to transmit or receive an availability indication to an IAB node (e.g., child IAB node). In certain embodiments, a node (e.g., a parent IAB node) may send an AI based on measurements performed by the node or a measurement report received by the node. The AI may be in the time domain and/or the frequency domain. Then, based on the AI, the receiving IAB node (e.g., a child IAB node) may schedule communications on soft resources as indicated by the AI message.

In some embodiments, an action may include to transmit or receive a control message scheduling a new channel. This action may be taken if communications and/or channels are prioritized or when the interference measurement is performed in association with a set and/or subset of resources.

In various embodiments, communications and/or channels may be prioritized. In such embodiments, a higher priority communication and/or channel may be scheduled first. Then, an early interference evaluation is performed to assess the interference that the scheduled communication and/or channel may impose on any new communication and/or channel. If the interference is not prohibitive based on a measurement by a node or a measurement report received by the node, a lower priority communication and/or channel may further be scheduled by the node that possibly shares resources in the frequency domain (e.g., for FDM) and/or the spatial domain (e.g., for SDM) with the higher priority channel.

In certain embodiments, a priority for a communication and/or channel may be determined by a QoS parameter, whether a communication is to be scheduled based on a preemptive buffer status report (e.g., pre-BSR), a value of scheduling offset (e.g., K0, K1, K2), a type of the signal or channel (e.g., shared channel vs. control channel vs. reference signals), or the like.

In some embodiments, the interference measurement is performed in association with a set and/or subset of resources. In such embodiments, an early interference evaluation is performed to assess the interference that a communication (e.g., potential communication) on the set and/or subset of resources may impose on a new communication and/or channel. If the interference is not prohibitive based on a measurement by a node or a measurement report received by the node, a lower priority communication and/or channel may be scheduled by the node that possibly shares resources in the frequency domain (e.g., via FDM) and/or the spatial domain (e.g., via SDM) with the set and/or subset of resources.

In various embodiments, an action may be to perform or cancel and/or reject a communication on a previously scheduled channel. In such embodiments, a node may decide whether to perform a communication as scheduled or cancel and/or reject the communication based on a measurement performed by the node (or based on a measurement report received by the node).

In certain embodiments, there may be a link adaptation. In such embodiments, the result of an interference measurement may be used to evaluate a quality of a channel and, consequently, to perform a link adaptation mechanism such as adjusting a transmission power, sending a transmission power control ("TPC") command, rate adaptation by selecting a modulation and coding scheme ("MCS"), or the like.

In some embodiments, configurations may deviate from and/or extend configurations and signaling found herein.

In various embodiments, a node N may serve multiple child nodes C. Moreover, communication between a node N and a child node C1 may demand applying a different beam (e.g., spatial parameters) from a beam for communication between the node N and another child node C2. In such embodiments, multiple reference signals (e.g., EIM-RS) may be transmitted and/or received and/or measured for evaluating a best-case interference or a worst-case interference.

In certain embodiments, a node N may be served by multiple parent nodes P (e.g., for dual connectivity ("DC") or other multi-parent scenarios. Moreover, communication between a node N and a parent node P1 may demand applying a different beam (e.g., spatial parameters) from a beam for communication between the node N and another parent node P2. In such embodiments, multiple reference signals (e.g., EIM-RS) may be transmitted and/or received and/or measured for evaluating a best-case interference or a worst-case interference.

In some embodiments, an AI for a soft resource may be per node or per link. In various embodiments, an AI may be per node (e.g., availability of a soft resource is indicated for communication with any other node). For example, if a parent node P indicates a soft downlink resource as available for a node N, then N may use the soft downlink resource for communication with any child node C. In such embodiments, P may indicate the resource as available when the interference caused by communication between the node N and any child node C is sufficiently low.

In various embodiments, an AI may be per link (e.g., availability of a soft resource is indicated for communication with another specific node). For example, if a parent node P indicates a soft downlink resource as available for a node N and for a child node C, then N may use the soft downlink resource for communication with the specific child node C. In such embodiments, P may indicate the resource as available when the interference caused by communication between the node N and the specific child node C is sufficiently low.

In certain embodiments, based on a measurement or a measurement report, a node may use a higher layer interface (e.g., such as a frequency 1 ("F1") interface or another interface specified) to inform other nodes in the IAB system (or another IAB system in a vicinity) of high interference. For example, for a resource set or a resource pool for transmitting an EIM-RS (e.g., CSI-RS, SRS, etc.) are shared among IAB nodes connected to one or multiple IAB-CUs. An alternative may be a case where a resource set or a resource pool is configured for a first at least one IAB node for interference evaluation, while a second at least one IAB node is configured with a time gap for performing measurements. In such embodiments, the at least second IAB node may use a higher layer interface for informing the first at least one IAB node of a high interference on a resource from the resource set or the resource pool. Provided that the resource indication is sufficiently specific, the signaling may provide resources, as well as beams and transmission power values associated with the indicated resources, that cause a high or low interference.

In some embodiments, a time gap may be configured by a new configuration. In various embodiments, a time gap may be realized by configuring not-available ("NA") resources. In certain embodiments, a time gap may be realized by configuring soft resources and indicating them not available by DCI message if an interference measurement is to be performed.

In various embodiments, if signaling is not local (e.g., where IAB nodes are not directly connected or where IAB nodes are connected to multiple IAB-CUs), a broadcast signaling such as a one or multiple parameters in a system information block ("SIB") may be used to carry information that would otherwise be carried by an L1 signaling, a MAC signaling, an RRC configuration, or a higher layer interface communication. The SIB may include information about reference signal resources, an associated beam, a power, timing information, and the like.

In certain embodiments, early interference evaluation of embodiments described herein may be adopted for evaluating interference on communications scheduled by a configured grant, a semi-persistent scheduled ("SPS") channel, and so forth. Since a semi-persistent communication channel (e.g., possibly accompanied by semi-static beam, power, and/or timing configurations) may provide a communication pattern more predictable to other nodes. The system may enjoy a significant performance advantage by adopting an interference evaluation without sacrificing a large number of resources for each occurrence of the channel.

In some embodiments, an early interference evaluation method may be used to manage interference between an enhanced IAB node and a legacy IAB node or gNB. In such embodiments, configurations for a legacy IAB node or gNB may be compatible with legacy configurations (e.g., reference signal configurations, measurement and reporting configurations, and so forth), while the enhanced configuration and signaling herein may be adopted in the enhanced IAB node to improve efficiency by implicit signaling (e.g., beam indication, power control indication, timing alignment indication, and so forth).

In some embodiments, embodiments herein may be used not only for interference evaluation, but also for a channel measurement such as a multi-point multi-input multi-output ("MIMO") communication. In such embodiments, the measurement report may include a multi-point CSI such as reference signal resource indicator (e.g., beam indicator), a rank indicator ("RI"), a precoding matrix indicator ("PMI"), a channel quality indicator ("CQI"), a receive signaling receive power ("RSSP"), a Type II codeword, or the like. A corresponding action such as a scheduling, an availability indication, a link adaptation, or the like may then follow.

In some embodiments, the terms antenna, panel, and antenna panel are used interchangeably. An antenna panel may be hardware that is used for transmitting and/or receiving radio signals at frequencies lower than 6 GHz (e.g., frequency range 1 ("FR1")), or higher than 6 GHz (e.g., frequency range 2 ("FR2") or millimeter wave ("mm-Wave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/pr unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}. Other QCL-Types may be defined based on combination of one or large-scale properties.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In certain embodiments, QCL-TypeA, QCL-TypeB, and QCL-TypeC may be applicable for all carrier frequencies, but QCL-TypeD may be applicable only in higher carrier frequencies (e.g., mmWave, FR2, and beyond), where the UE may not be able to perform omni-directional transmission (e.g., the UE would need to form beams for directional transmission). For a QCL-TypeD between two reference signals A and B, the reference signal A is considered to be spatially co-located with reference signal B and the UE may assume that the reference signals A and B can be received with the same spatial filter (e.g., with the same RX beamforming weights).

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In certain embodiments, a transmission configuration indicator ("TCI") state ("TCI-state") associated with a target transmission may indicate parameters for configuring a quasi-co-location relationship between the target transmission (e.g., target RS of demodulation ("DM") reference signal ("RS") ("DM-RS") ports of the target transmission during a transmission occasion) and a source reference signal (e.g., synchronization signal block ("SSB"), CSI-RS, and/or sounding reference signal ("SRS")) with respect to quasi co-location type parameters indicated in a corresponding TCI state. The TCI describes which reference signals are used as a QCL source, and what QCL properties may be derived from each reference signal. A device may receive a configuration of a plurality of transmission configuration indicator states for a serving cell for transmissions on the serving cell. In some embodiments, a TCI state includes at least one source RS to provide a reference (e.g., UE assumption) for determining QCL and/or a spatial filter.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

It should be noted that, although the entities herein may be referred to as IAB nodes, the same embodiments may be applied to IAB donors, which are the IAB entities connecting the core network to the IAB network, with minimum or zero modifications.

Moreover, the steps described herein may be performed in any order and/or in any combination.

In certain embodiments, each configuration and/or embodiment may be provided by one or more embodiments. Moreover, an earlier configuration may provide a subset of parameters while a later configuration may provide another subset of parameters. In some embodiments, a later configuration may override values provided by an earlier configuration or a pre-configuration.

In various embodiments, a configuration may be provided by radio resource control ("RRC") signaling, medium-access control ("MAC") signaling, a physical layer signaling such as a downlink control information ("DCI") message, a combination thereof, or other signaling. Further, a configuration may include a pre-configuration or a semi-static configuration provided by a standard, by a vendor, and/or by a network and/or operator. Each parameter value received through configuration or indication may override previous values for a similar parameter.

In certain embodiments, despite frequent references to IAB, the embodiments herein may be applicable to wireless relay nodes and other types of wireless communication entities. Any parameter discussed in this disclosure may appear as a linear function of that parameter in signaling or specifications.

In some embodiments, in any timing assignment for a slot that contains a signal, a timing assignment in the text or in an equation by a sign such as '=' or:=' or a like may mean that the start time of the slot containing the signal is equal to a determined value such as a right hand side of the equation. In various embodiments, a start time of a slot containing a signal may be different from the determined value by an integer multiple of $T_{slot}$, where $T_{slot}$ denotes a slot duration for a given numerology or subcarrier spacing ("SCS"). In certain embodiments, values may be different by an integer multiple of $T_{symbol}$ rather than an integer multiple of $T_{slot}$, where $T_{symbol}$ denotes a symbol duration for a given numerology or SCS.

In various embodiments, a vendor manufacturing IAB systems and/or devices and an operator deploying the IAB systems and/or devices may negotiate capabilities of systems and/or devices. Further, some of the information assumed to need signaling between entities may be available to the devices by storing the information on a memory unit such as a read-only memory ("ROM)", exchanging the information by proprietary signaling methods, providing the information by a configuration, or otherwise taking the information into account when creating hardware and/or software of the IAB systems and/or devices or other entities in the network.

In certain embodiments, methods and systems proposed for an IAB-MT may be used by a UE. If a method or system requires a capability that is not supported by a legacy UE, a UE enhanced to possess the capability may be used. In such a case, the UE may be referred to as an enhanced UE or an IAB-enhanced UE and may convey its information of its enhanced capability to the network for proper configuration and operation.

As used herein, a node or a wireless node may refer to an IAB node, an IAB-DU, an IA-MT, a UE, a base station ("BS"), a gNodeB ("gNB"), a transmit-receive point ("TRP"), or an IAB donor, and so forth. In embodiments described herein, type of nodes are not meant to limit the scope of such embodiments.

Figure 35:
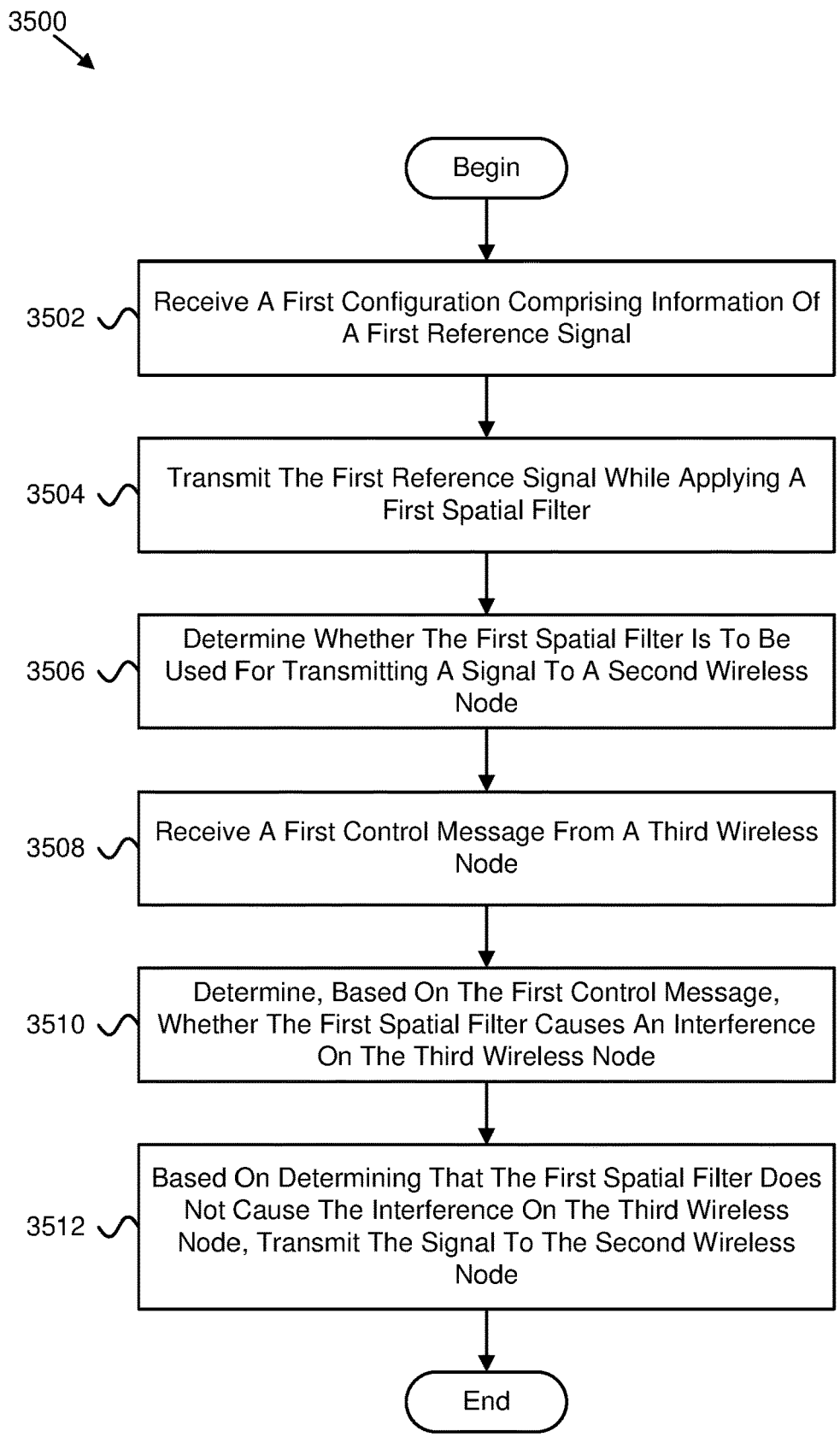
FIG. 35 is a flow chart diagram illustrating one embodiment of a method for transmissions to not cause interference.

FIG. 35 is a flow chart diagram illustrating one embodiment of a method 3500 for transmissions to not cause interference. In some embodiments, the method 3500 is performed by an apparatus, such as the network unit 104. In certain embodiments, the method 3500 may be performed by a processor executing program code, for example, a microcontroller, a microprocessor, a CPU, a GPU, an auxiliary processing unit, a FPGA, or the like.

In various embodiments, the method 3500 includes receiving 3502, at a first wireless node, a first configuration including information of a first reference signal. In some embodiments, the method 3500 includes transmitting 3504 the first reference signal while applying a first spatial filter. In certain embodiments, the method 3500 includes determining 3506 whether the first spatial filter is to be used for transmitting a signal to a second wireless node. In various embodiments, the method 3500 includes receiving 3508 a first control message from a third wireless node. In some embodiments, the method 3500 includes determining 3510, based on the first control message, whether the first spatial filter causes an interference on the third wireless node. In certain embodiments, the method 3500 includes, based on determining that the first spatial filter does not cause the interference on the third wireless node, transmitting 3512 the signal to the second wireless node.

In certain embodiments, the first control message comprises an indication of whether the first reference signal causes the interference on the third wireless node. In some embodiments, determining whether the first spatial filter is to be used for transmitting a signal to a second wireless node comprises receiving a second control message from the second wireless node. In various embodiments: the first wireless node is an integrated access and backhaul node; the second wireless node is a child node of the first wireless node; and the third wireless node is a parent node of the first wireless node.

In one embodiment: the first reference signal is a synchronization signal and physical broadcast channel block, a channel state information reference signal, or a combination thereof; and the first reference signal is associated with an integrated access and backhaul distributed unit of the first wireless node. In certain embodiments, the first control message is a downlink control information message, a medium access control message, or a combination thereof.

In some embodiments: the first wireless node is an integrated access and backhaul node; the second wireless node is a parent node of the first wireless node; and the third wireless node is a child node of the first wireless node. In various embodiments: the first reference signal is a sounding reference signal; and the first reference signal is associated with an integrated access and backhaul mobile terminal of the first wireless node. In one embodiment, the first control message is an uplink control information message, a medium access control message, or a combination thereof.

In one embodiment, a method of a first wireless node comprises: receiving a first configuration comprising information of a first reference signal; transmitting the first reference signal while applying a first spatial filter; determining whether the first spatial filter is to be used for transmitting a signal to a second wireless node; receiving a first control message from a third wireless node; determining, based on the first control message, whether the first spatial filter causes an interference on the third wireless node; and based on determining that the first spatial filter does not cause the interference on the third wireless node, transmitting the signal to the second wireless node.

In certain embodiments, the first control message comprises an indication of whether the first reference signal causes the interference on the third wireless node.

In some embodiments, determining whether the first spatial filter is to be used for transmitting a signal to a second wireless node comprises receiving a second control message from the second wireless node.

In various embodiments: the first wireless node is an integrated access and backhaul node; the second wireless node is a child node of the first wireless node; and the third wireless node is a parent node of the first wireless node.

In one embodiment: the first reference signal is a synchronization signal and physical broadcast channel block, a channel state information reference signal, or a combination thereof; and the first reference signal is associated with an integrated access and backhaul distributed unit of the first wireless node.

In certain embodiments, the first control message is a downlink control information message, a medium access control message, or a combination thereof.

In some embodiments: the first wireless node is an integrated access and backhaul node; the second wireless node is a parent node of the first wireless node; and the third wireless node is a child node of the first wireless node.

In various embodiments: the first reference signal is a sounding reference signal; and the first reference signal is associated with an integrated access and backhaul mobile terminal of the first wireless node.

In one embodiment, the first control message is an uplink control information message, a medium access control message, or a combination thereof.

In one embodiment, an apparatus comprises a first wireless node. The apparatus further comprises: a receiver that receives a first configuration comprising information of a first reference signal; a transmitter that transmits the first reference signal while applying a first spatial filter; and a processor that determines whether the first spatial filter is to be used for transmitting a signal to a second wireless node, wherein: the receiver receives a first control message from a third wireless node; the processor determines, based on the first control message, whether the first spatial filter causes an interference on the third wireless node; and based on determining that the first spatial filter does not cause the interference on the third wireless node, the transmitter transmits the signal to the second wireless node.

In certain embodiments, the first control message comprises an indication of whether the first reference signal causes the interference on the third wireless node.

In some embodiments, the processor determining whether the first spatial filter is to be used for transmitting a signal to a second wireless node comprises the receiver receiving a second control message from the second wireless node.

In various embodiments: the first wireless node is an integrated access and backhaul node; the second wireless node is a child node of the first wireless node; and the third wireless node is a parent node of the first wireless node.

In one embodiment: the first reference signal is a synchronization signal and physical broadcast channel block, a channel state information reference signal, or a combination thereof; and the first reference signal is associated with an integrated access and backhaul distributed unit of the first wireless node.

In certain embodiments, the first control message is a downlink control information message, a medium access control message, or a combination thereof.

In some embodiments: the first wireless node is an integrated access and backhaul node; the second wireless node is a parent node of the first wireless node; and the third wireless node is a child node of the first wireless node.

In various embodiments: the first reference signal is a sounding reference signal; and the first reference signal is associated with an integrated access and backhaul mobile terminal of the first wireless node.

In one embodiment, the first control message is an uplink control information message, a medium access control message, or a combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a first wireless node comprising a first function and a second function, the method comprising:
   receiving a first configuration comprising information of a first reference signal (RS) for the first function;
   transmitting, via the first function, the first RS while applying a first spatial filter, wherein the first spatial filter is used for transmitting a signal to a second wireless node connected to the first function;
   receiving, via the second function, a first control message from a third wireless node connected to the second function;
   determining, based on the first control message, whether applying the first spatial filter causes an interference on the third wireless node; and
   based on determining that the first spatial filter does not cause the interference on the third wireless node, transmitting, via the first function, the signal to the second wireless node while applying the first spatial filter.

2. The method of claim 1, wherein the first control message comprises an indication of whether the first RS causes the interference on the third wireless node.

3. The method of claim 1, wherein:
the first wireless node is an integrated access and backhaul (IAB) node;
the first function is an IAB distributed unit (IAB-DU);
the second function is an IAB mobile terminal (IAB-MT);
the second wireless node is a child node of the first wireless node, a user equipment (UE), or a combination thereof; and
the third wireless node is a parent node of the first wireless node, an integrated access and backhaul donor, or a combination thereof.

4. The method of claim 1, wherein:
the first RS is a synchronization signal and physical broadcast channel block (SS/PBCH), a channel state information (CSI) RS (CSI-RS), or a combination thereof; and
the first RS is associated with an integrated access and backhaul distributed unit (IAB-DU) of the first wireless node.

5. The method of claim 1, wherein the first control message is a downlink control information (DCI) message, a medium access control (MAC) message, or a combination thereof.

6. The method of claim 1, wherein:
the first wireless node is an integrated access and backhaul (IAB) node;
the first function is an IAB mobile terminal (IAB-MT);
the second function is an IAB distributed unit (IAB-DU);
the second wireless node is a parent node of the first wireless node, an IAB donor, or a combination thereof; and
the third wireless node is a child node of the first wireless node, a user equipment (UE), or a combination thereof.

7. The method of claim 1, wherein:
the first RS is a sounding reference signal (SRS); and
the first RS is associated with an integrated access and backhaul mobile terminal (IAB-MT) of the first wireless node.

8. The method of claim 1, wherein the first control message is a downlink control information (DCI) message, an uplink control information (UCI) message, a medium access control (MAC) message, or a combination thereof.

9. An apparatus for wireless communication, the apparatus comprising:
a processor; and
a memory coupled to the processor, the memory comprising instructions executable by the processor to cause the apparatus to:
receive a first configuration comprising information of a first reference signal (RS) for a first function of the apparatus;
transmit, via the first function, the first RS while applying a first spatial filter, wherein the first spatial filter is used for transmitting a signal to a second wireless node connected to the first function;
receive, via a second function of the apparatus, a first control message from a third wireless node connected to the second function;
determine, based on the first control message, whether applying the first spatial filter causes an interference on the third wireless node; and
based on determining that the first spatial filter does not cause the interference on the third wireless node, transmit, via the first function, the signal to the second wireless node while applying the first spatial filter.

10. The apparatus of claim 9, wherein the first control message comprises an indication of whether the first RS causes the interference on the third wireless node.

11. The apparatus of claim 9, wherein:
the first wireless node is an integrated access and backhaul (IAB) node;
the first function is an IAB distributed unit (IAB-DU);
the second function is an IAB mobile terminal (IAB-MT);
the second wireless node is a child node of the first wireless node; and
the third wireless node is a parent node of the first wireless node.

12. The apparatus of claim 9, wherein:
the first RS is a synchronization signal and physical broadcast channel block (SS/PBCH), a channel state information (CSI) RS (CSI-RS), or a combination thereof; and
the first RS is associated with an integrated access and backhaul distributed unit (IAB-DU) of the first wireless node.

13. The apparatus of claim 9, wherein the first control message is a downlink control information (DCI) message, an uplink control information (UCI) message, a medium access control (MAC) message, or a combination thereof.

14. The apparatus of claim 9, wherein:
the first wireless node is an integrated access and backhaul (IAB) node;
the first function is an IAB mobile terminal (IAB-MT);
the second function is an IAB distributed unit (IAB-DU);
the second wireless node is a parent node of the first wireless node; and
the third wireless node is a child node of the first wireless node.

15. The apparatus of claim 9, wherein:
the first RS is a sounding reference signal (SRS); and
the first RS is associated with an integrated access and backhaul mobile terminal (IAB-MT) of the first wireless node.

16. The method of claim 1, further comprising receiving a second control message from the second wireless node.

17. The apparatus of claim 9, wherein the instructions are further executable by the processor to cause the apparatus to receive a second control message from the second wireless node.

* * * * *